(12) United States Patent
Prabhu et al.

(10) Patent No.: US 12,664,011 B2
(45) Date of Patent: Jun. 23, 2026

(54) HYBRID CLOUD BASED PROTECTION FOR APPLICATIONS AND VIRTUAL MACHINES

(71) Applicant: NETAPP, INC., San Jose, CA (US)

(72) Inventors: Vasantha Sadananda Prabhu, Bangalore (IN); Nikhil Bhavadas Kaplingat, Bangalore (IN); Vineeth Karinta, Apex, NC (US); Ritu Parathody, Shoranur (IN); Boggala Prabhakar, Chittoor (IN); Madhusudhan Vondaraguppe Nanjundaiah, Channapatna (IN); Mohankumar Ganesan, Bangalore (IN); Suryanarayana Kolluri, Bangalore (IN); Balamurali Palaiah, Gilroy, CA (US); Sachin Anil Gandhi, Fremont, CA (US)

(73) Assignee: NETAPP, INC., San Jose, CA (US)

( * ) Notice: Subject to any disclaimer, the term of this patent is extended or adjusted under 35 U.S.C. 154(b) by 806 days.

(21) Appl. No.: 17/946,382

(22) Filed: Sep. 16, 2022

(65) Prior Publication Data

US 2023/0418651 A1 Dec. 28, 2023

Related U.S. Application Data

(60) Provisional application No. 63/367,009, filed on Jun. 24, 2022.

(51) Int. Cl.
*G06F 9/455* (2018.01)

(52) U.S. Cl.
CPC ..................... *G06F 9/45558* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 11,829,256 B2 * | 11/2023 | Bansod | .............. | G06F 11/1464 |
| 2016/0188621 A1 | 6/2016 | Karinta et al. | | |
| 2019/0340091 A1 | 11/2019 | Chandrasekaran et al. | | |
| 2020/0327013 A1 | 10/2020 | Palaiah et al. | | |
| 2020/0349016 A1 * | 11/2020 | Chang | ................. | G06F 11/1469 |
| 2020/0394110 A1 | 12/2020 | Ramohalli Gopala Rao et al. | | |
| 2021/0357246 A1 | 11/2021 | Kumar et al. | | |

* cited by examiner

*Primary Examiner* — Bradley A Teets
*Assistant Examiner* — Melissa A Headly
(74) *Attorney, Agent, or Firm* — JAFFERY WATSON HAMILTON & DESANCTIS LLP

(57) ABSTRACT

Methods and systems for applications and/or virtual machines ("VM") are provided. As an example, one method includes registering a storage system configured to store data for a VM; creating a policy for the VM for generating a VM backup by a storage management system interfacing with the storage system and a cloud-based microservice; storing, by the cloud-based micro-service, a copy of the VM backup at a cloud-based storage; receiving, by the cloud-based micro-service, an indication from the storage management system of a successful execution of a pre-restore operation upon unregistering the VM from a VM management system; and copying, by the cloud-based micro-service, VM data from the VM backup stored at the cloud-based storage to the storage system for executing a restore operation to restore the VM backup at the storage system.

14 Claims, 36 Drawing Sheets

B155

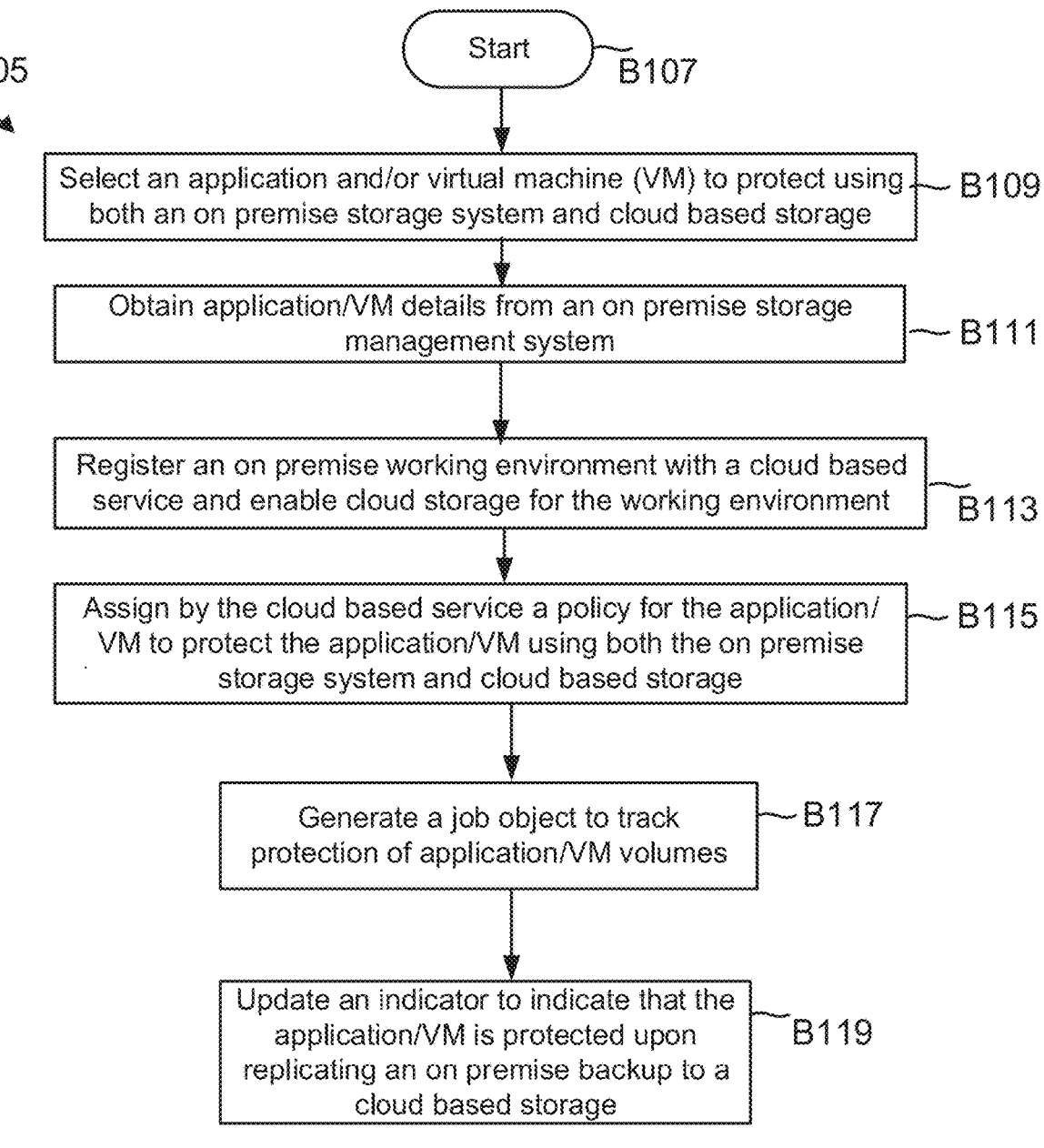

105

Start
B107

Select an application and/or virtual machine (VM) to protect using both an on premise storage system and cloud based storage
B109

Obtain application/VM details from an on premise storage management system
B111

Register an on premise working environment with a cloud based service and enable cloud storage for the working environment
B113

Assign by the cloud based service a policy for the application/VM to protect the application/VM using both the on premise storage system and cloud based storage
B115

Generate a job object to track protection of application/VM volumes
B117

Update an indicator to indicate that the application/VM is protected upon replicating an on premise backup to a cloud based storage
B119

Figure 1D:
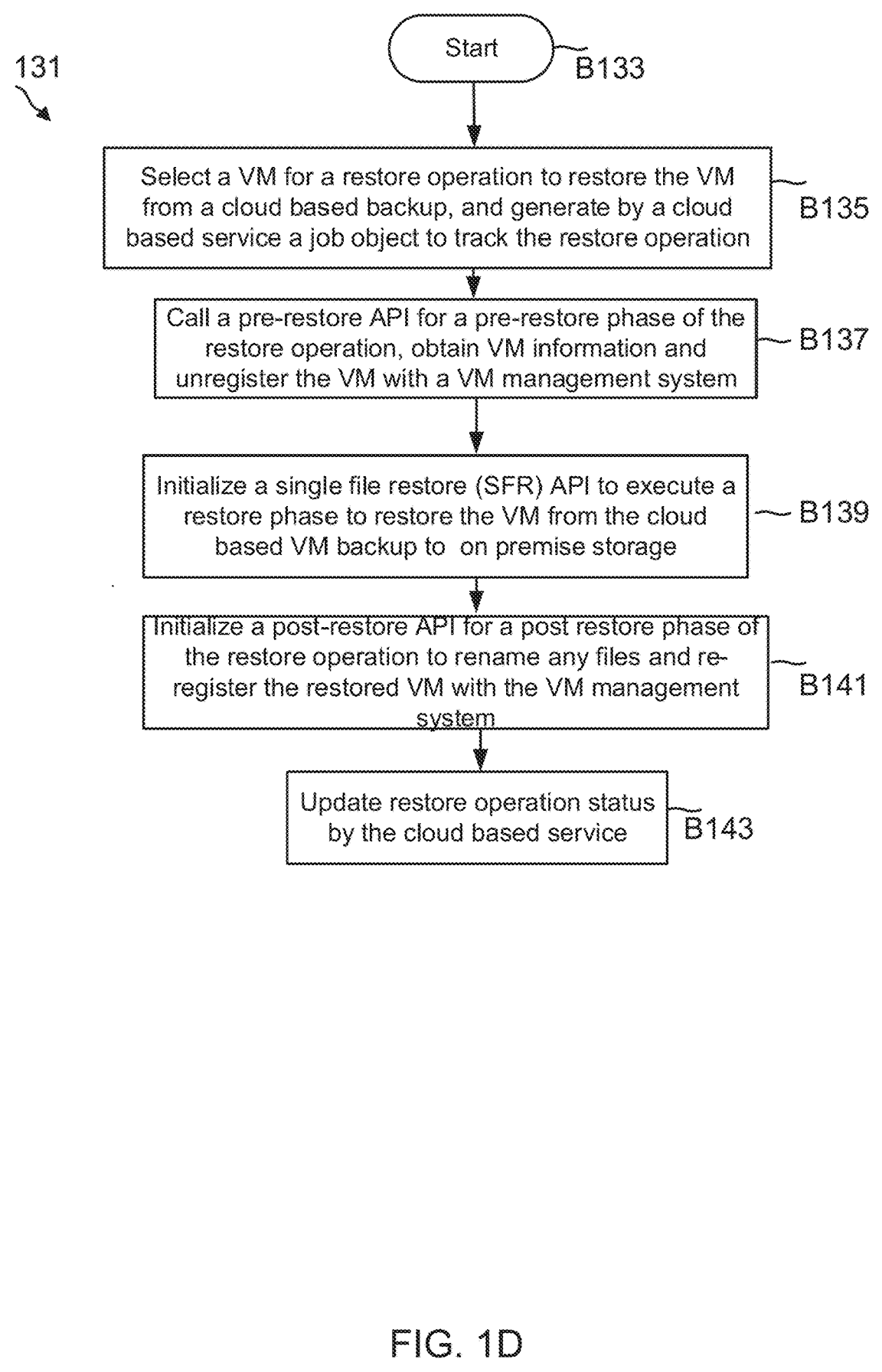

Start ~B133

Select a VM for a restore operation to restore the VM from a cloud based backup, and generate by a cloud based service a job object to track the restore operation ~ B135

Call a pre-restore API for a pre-restore phase of the restore operation, obtain VM information and unregister the VM with a VM management system ~B137

Initialize a single file restore (SFR) API to execute a restore phase to restore the VM from the cloud based VM backup to on premise storage ~B139

Initialize a post-restore API for a post restore phase of the restore operation to rename any files and re-register the restored VM with the VM management system ~B141

Update restore operation status by the cloud based service ~B143

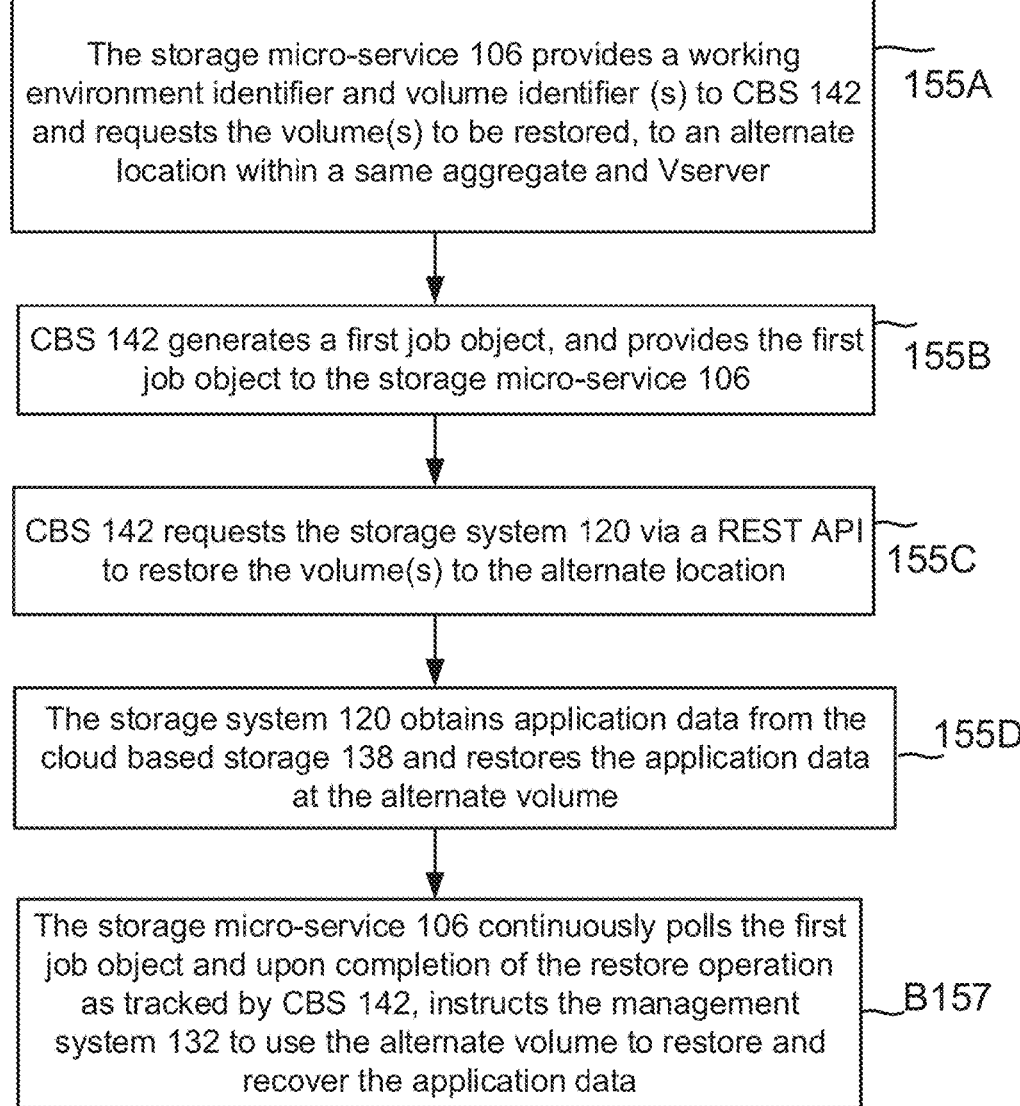

The storage micro-service 106 provides a working environment identifier and volume identifier (s) to CBS 142 and requests the volume(s) to be restored, to an alternate location within a same aggregate and Vserver ⎤ 155A CBS 142 generates a first job object, and provides the first job object to the storage micro-service 106 ⎤ 155B CBS 142 requests the storage system 120 via a REST API to restore the volume(s) to the alternate location ⎤ 155C The storage system 120 obtains application data from the cloud based storage 138 and restores the application data at the alternate volume ⎤ 155D The storage micro-service 106 continuously polls the first job object and upon completion of the restore operation as tracked by CBS 142, instructs the management system 132 to use the alternate volume to restore and recover the application data ⎤ B157

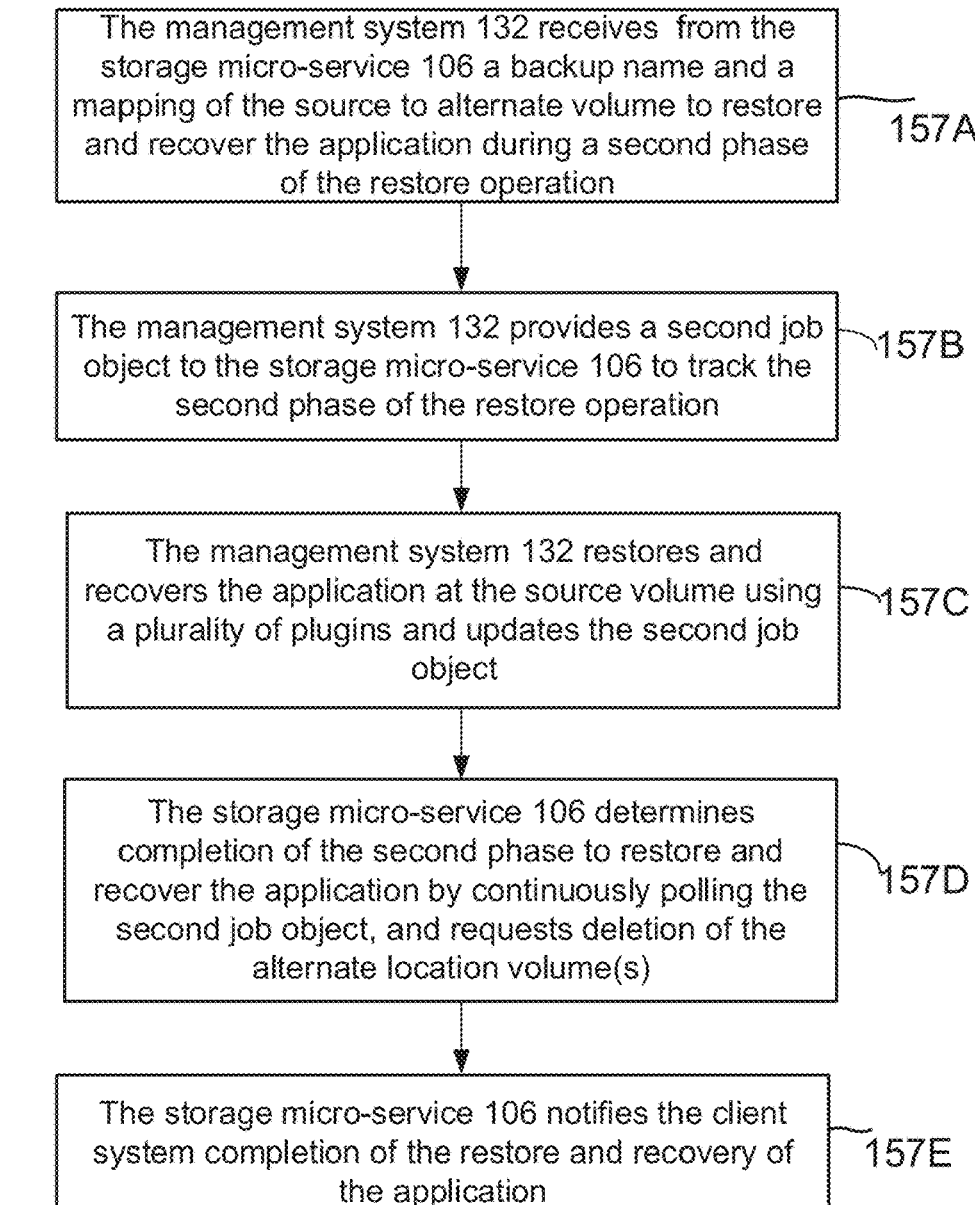

The management system 132 receives from the storage micro-service 106 a backup name and a mapping of the source to alternate volume to restore and recover the application during a second phase of the restore operation    157A The management system 132 provides a second job object to the storage micro-service 106 to track the second phase of the restore operation    157B The management system 132 restores and recovers the application at the source volume using a plurality of plugins and updates the second job object    157C The storage micro-service 106 determines completion of the second phase to restore and recover the application by continuously polling the second job object, and requests deletion of the alternate location volume(s)    157D The storage micro-service 106 notifies the client system completion of the restore and recovery of the application    157E

Figure 1H:
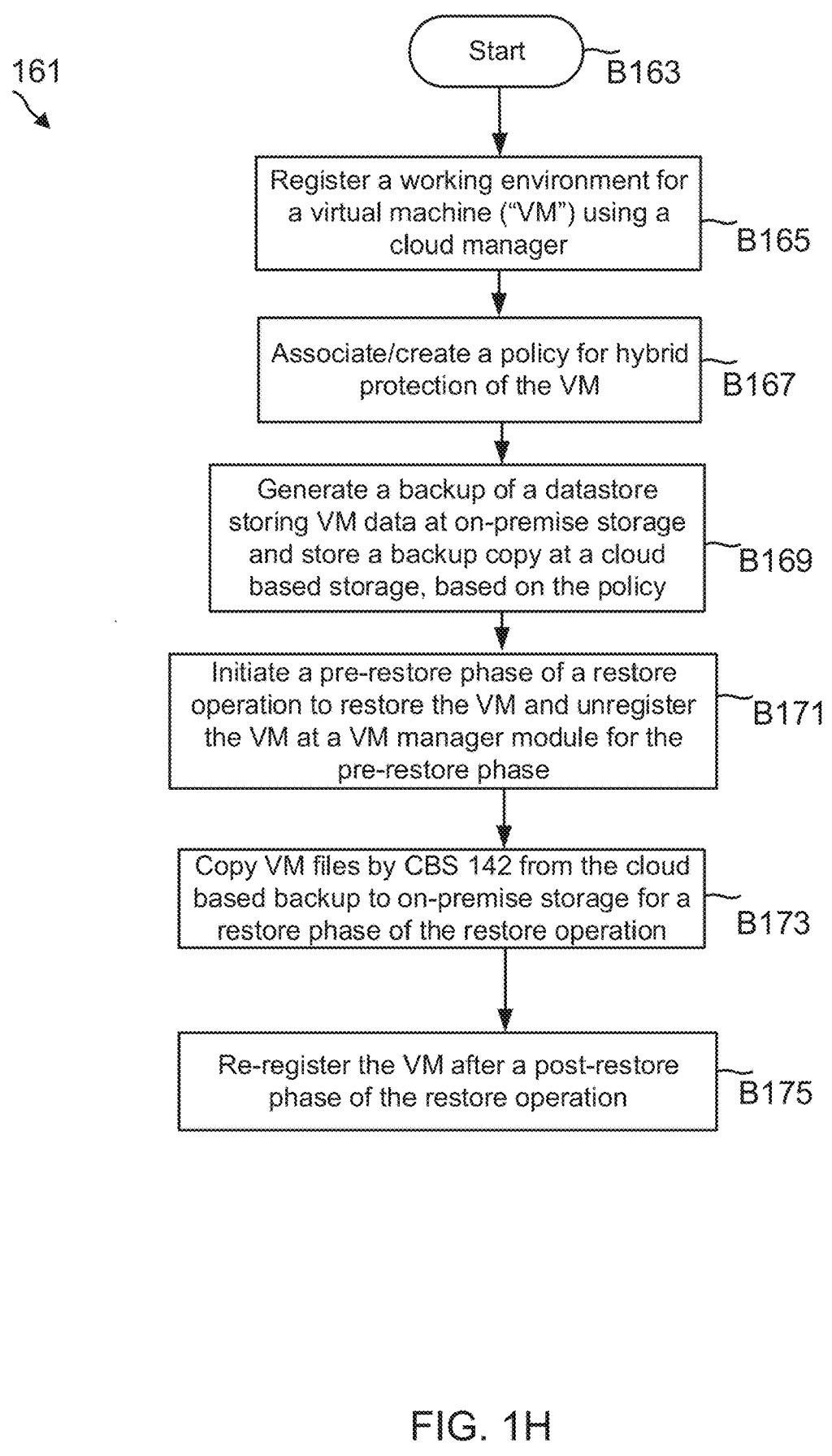

Start
B163

Register a working environment for a virtual machine ("VM") using a cloud manager
B165

Associate/create a policy for hybrid protection of the VM
B167

Generate a backup of a datastore storing VM data at on-premise storage and store a backup copy at a cloud based storage, based on the policy
B169

Initiate a pre-restore phase of a restore operation to restore the VM and unregister the VM at a VM manager module for the pre-restore phase
B171

Copy VM files by CBS 142 from the cloud based backup to on-premise storage for a restore phase of the restore operation
B173

Re-register the VM after a post-restore phase of the restore operation
B175

HYBRID CLOUD BASED PROTECTION FOR APPLICATIONS AND VIRTUAL MACHINES

CROSS-REFERENCE TO RELATED APPLICATION

This patent application claims priority under 35 USC 119(e) to U.S. Provisional Patent Application Ser. No. 63/367,009, filed on Jun. 24, 2022, the disclosure of which is incorporated herein by reference.

Copyright Notice

A portion of this disclosure contains material which is subject to copyright protection. The assignee of this application has no objection to the facsimile reproduction of this patent application including the copyrighted material, as it appears in the USPTO patent file or records, but otherwise reserves all copyrights whatsoever.

Technical Field

The present disclosure relates to cloud-based storage systems and more particularly to protecting applications and/or virtual machines at both on-premise data centers and cloud-based storage from a cloud-based management system.

Background

Various forms of storage systems are used today. These forms include direct attached storage (DAS) systems, network attached storage (NAS) systems, storage area networks (SANs), and others. Network storage systems are commonly used for a variety of purposes, such as providing multiple users with access to shared data, backing up data and others. A storage system typically includes at least one computing system executing a storage operating system for storing and retrieving data on behalf of one or more client computing systems ("clients"). The storage operating system stores and manages shared data containers in a set of mass storage devices. Storage systems are used by different applications, for example, database systems, electronic mail (email) servers, virtual machines executed within virtual machine environments (for example, a hypervisor operating environment) and others to store and protect data.

Storage today is also made available in a cloud computing environment where storage is presented and shared across different computing platforms. Cloud computing means computing capability that provides an abstraction between a computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" herein is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. After the application layer is a cloud platform and cloud infrastructure, followed by a "server" layer that includes hardware and computer software designed for cloud specific services.

Applications and virtual machines should be efficiently protected using both on-premises data centers and cloud-based storage. Continuous efforts are being made to develop technology to better protect applications and/or virtual machines.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures:

FIG. 1C shows a process for hybrid protection of applications/virtual machines, according to one aspect of the present disclosure;

FIG. 1D shows a process for restoring a virtual machine at on-premise storage from a cloud-based backup copy, according to one aspect of the present disclosure;

FIG. 1F shows a process for a first phase of a restore operation for storing application data to an alternate, on-premise storage location from a cloud-based backup copy, according to one aspect of the present disclosure;

FIG. 1G shows a process for restoring and recovering the application using the alternate location by management system, according to one aspect of the present disclosure;

FIG. 1H shows a process for protecting and restoring a virtual machine, according to one aspect of the present disclosure;

FIG. 2B-2 shows an example of a screen shot with policy details associated with an application, used according to one aspect of the present disclosure;

FIG. 2I shows an example of a screen that presents the restore operation scope, according to one aspect of the present disclosure;

FIG. 3I shows an example of a screen for assigning a policy to protect a virtual machine, according to one aspect of the present disclosure;

DETAILED DESCRIPTION

Figure 1A:
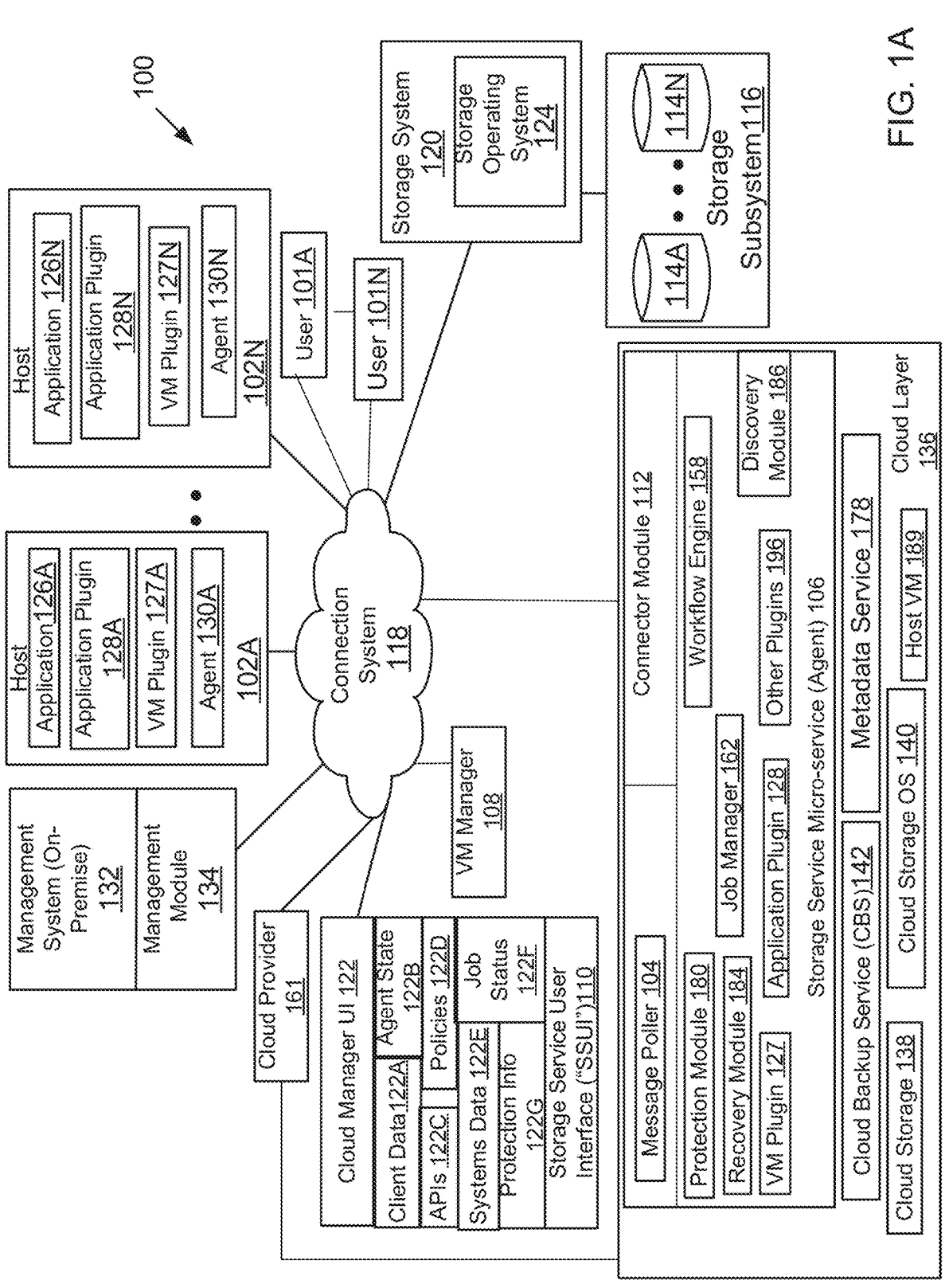
FIG. 1A shows an example of an operating environment for protecting and managing data stored in cloud platforms and on-premise data centers, according to various aspects of the present disclosure.

In one aspect, innovative computing technology is provided for protecting data stored within a cloud infrastructure and/or on-premise data center. An on-premise storage management system typically protects applications/virtual machines (VMs). However, an efficient solution for hybrid cloud environments, where a backup of application data/VM data is stored at an on-premise data center and cloud-based storage and a cloud-based backup copy is used to restore the application/VM does not exist in conventional data protection and restore technology. The present technology disclosed herein enables storing backup of application and/or VMs at on-premise storage and cloud-based storage. Application objects and/or VMs can be selected from a cloud-based interface to restore an application/VM to an on-premise storage system from a cloud-based backup copy, and vice-versa, providing flexibility to user computing systems.

The innovative technology described below in detail provides hybrid cloud protection for an application/VM. Enterprise applications are typically deployed across one or more storage volumes (also referred to as volumes). Similarly, VM's can span multiple datastores/storage volumes. A VM management system typically manages VMs within a datastore. The term datastore as used throughout this specification means a uniquely identified logical structure that is a mapped to a storage volume, and hence the terms datastore(s) and storage volume(s) are used interchangeably. An application/VM consistent backup typically includes multiple snapshots that may span across multiple volumes where the application/VM resides. The disclosed technology herein solves the complexities of protecting and restoring application/VMs by discovering eligible on-premise applications which are candidates for cloud-based protection, discovering storage volumes where application/VM resides, providing cloud-based protection based on application/VM policies, applying replication labels to snapshots according based on defined policies, determining application/VM consistent backups in a cloud layer, persisting application/VM metadata in a cloud based metadata service, and presenting metadata in a backup inventory that can be used for restoring application/VM as a whole from backups stored at a cloud based storage back to on-premise storage.

As a preliminary note, the terms "component", "module", "system," and the like as used herein are intended to refer to a computer-related entity, either software-executing general-purpose processor, hardware, firmware, and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components may be stored, for example, at non-transitory, computer readable media including, but not limited to, an ASIC (application specific integrated circuit), CD (compact disc), DVD (digital video disk), ROM (read only memory), solid state drive, hard disk, EEPROM (electrically erasable programmable read only memory), non-volatile memory or any other storage device, in accordance with the claimed subject matter.

System 100/100A: FIG. 1A shows an example of a system 100, to implement the various adaptive aspects of the present disclosure. In one aspect, system 100 includes a storage system 120 (may also be referred to as an "on-premise" storage system 120 or a working environment for a cloud based protection policy), an on-premise, management system 132, computing system 102A-102N, a virtual machine ("VM") manager 108 that manages VMs using datastores, a cloud layer 136, a cloud provider 161 (e.g., Amazon Web Services ("AWS") provided by Amazon Inc, Azure provided by Microsoft Corporation, or Google Cloud Platform provided by Alphabet Inc. (without derogation of any trademark rights of Amazon Inc., Microsoft Corporation or Alphabet Inc.), or any other cloud provider, a cloud manager 122 and a connector module 112, described below in detail. The connector module 112 executes a storage services micro-service 106, also referred to as agent 106 that interfaces with various components of system 100 for providing hybrid protection for applications and/or VMs, as described below in detail.

The computing systems 102A-102N (shown as host 102, 102A-102N and may also be referred to as a "host system 102", "host systems 102", "server 102" or "servers 102") are communicably coupled to the storage system 120 that executes a storage operating system 124 via a connection system 118 such as a local area network (LAN), wide area network (WAN), the Internet and others. As described herein, the term "communicably coupled" may refer to a direct connection, a network connection, or other connections to provide data-access service to user consoles (or computing devices) 101A-101N (may also be referred to as "user 101," "users 101," "client system 101" or "client systems 101").

Client systems 101 are computing devices that can access storage space at the storage system 120 via the connection system 118 or within the cloud layer 136 presented by the cloud provider 161 or any other entity. The client systems 101 can also access computing resources, like a host VM 189 via the cloud layer 136. A client may be the entire system of a company, a department, a project unit, or any other entity. Each client system is uniquely identified and optionally, may be a part of a logical structure called a storage tenant (not shown). The storage tenant represents a set of users (may also be referred to as storage consumers) for the cloud provider 161 that provides access to cloud-based storage and/or compute resources via the cloud layer 136 and/or storage managed by the storage system 120. In one aspect, the cloud layer 136 is configured as a virtual private cloud (VPC), a logically isolated section of a cloud infrastructure that simulates an on-premises data center.

In one aspect, the cloud manager 122 with a storage services user interface ("SSUI") 110 is provided as a software application running on a computing device or a VM for configuring, protecting and managing storage objects. The cloud manager 122 enables access to a storage service (e.g., backup, restore, cloning or any other storage related service) from the storage micro-service 106 made available from the cloud layer 136 via the SaaS layer 142.

As an example, the cloud manager 122 is part of or interfaces with a SaaS layer (not shown), e.g., a "Azure Kubernetes Cluster," while a non-limiting example of the cloud layer 136 is a cloud platform provided by Alphabet Inc, Azure cloud platform provided by Microsoft Corporation, or AWS, without any derogation of any third-party trademark rights.

Software applications today are built using "containers," which are also referred to as "micro-services." Kubernetes is an open-source software platform for deploying, managing and scaling such containers. Azure is a cloud computing platform provided by Microsoft Corporation (without derogation of any third-party trademark rights) for building, testing, deploying, and managing applications and services. Azure Kubernetes Service enables deployment of a production ready Kubernetes cluster in the Azure cloud. It is noteworthy that the adaptive aspects of the present disclosure are not limited to any specific cloud platform or SaaS layer.

The term micro-service as used herein denotes computing technology for providing a specific functionality in system 100. As an example, the storage micro-service 106 may be deployed as a container (e.g., a "Docker" container), is stateless in nature, may be exposed as a REST (representational state transfer) application programming interface (API) and is discoverable by other services. Docker is a software framework for building and running micro-services using the Linux kernel (without derogation of any third-party trademark rights). The various aspects described herein are not limited to the Linux kernel. In one aspect, Docker micro-service code for the storage micro-service 106 is packaged as a "Docker image file". A Docker container is then initialized using an associated image file. A Docker container is an active or running instantiation of a Docker image. Each Docker container provides isolation and resembles a lightweight virtual machine. It is noteworthy that many Docker containers can run simultaneously in a same Linux computing system.

In one aspect, one or more data structures are used to implement the innovative aspects of the present disclosure. For example, the data structures include a client data structure 122A (may also be referred to as data structure 122A), an agent state data structure 122B (may also be referred to as data structure 122B), an API data structure 122C (may also be referred to as data structure 122C), a policies data structure 122D (may also be referred to as data structure 122D), a systems data structure 122E (may also be referred to as data structure 122E), a job status data structure 122F (may also be referred to as data structure 122F) and protection information 122G (may also be referred to as data structure 122G) are maintained to enable hybrid protection for applications and/or VM via the cloud manager 122 as described below in detail. The various data structures are accessible to the cloud manager 122 and may be saved at one or more storage devices. It is noteworthy that the data structures 122A-122G can be implemented as a single data structure or multiple data structures.

In one aspect, data structure 122A stores user (i.e., client system) information including a user identifier, a network domain for the user device, a user account identifier, or any other information. The data structure 122B stores an indicator indicating if a cloud manager 122 instance with a unique identifier is operational and deployed. The data structure 122C stores APIs that are used by the cloud manager 122 and/or agent 106 for managing storage services operations described below in detail. The data structure 122D stores one or more policy objects for each stored policy. The policy object may include one or more of a policy identifier, a policy name, policy description, a backup schedule policy, a retention count as to how long a backup is to be retained, a replication policy to replicate a backup from one location to another, types of backups, application consistent backups, and verification policies to verify a backup and others. Furthermore, the policy object indicates if both on-premise and cloud-based protection, referred to as hybrid protection, has been extended to an application and/or VM, as described below in detail. It is noteworthy that a policy object may be shared across multiple application/VM instances.

The data structure 122E stores system level information that identifies an application, a VM, if applicable, an application type, the storage associated with the application and/or VM (e.g., a datastore to volume mapping indicating the volume used by the VM), a policy associated with the application as well as protection status information for objects stored by the application and/or VM. The data structure 122E stores an entry for each system that is added via the cloud manager 122. The data structure 122F is used by the cloud manager 122 to track the progress of each job. The term job as used herein means a storage service operation, e.g., a backup, restore, clone or any other related operation. The data structure 122G stores protection information for each application and/or datastore used by one or more VMs. This information includes objects that are protected by backups, objects that are unprotected and objects that may need attention. The data structure 122G also stores topology information showing local backups taken from the cloud layer 136 and remote backups taken by the storage system 120.

In one aspect, the cloud layer 136 includes/interfaces with a connector module 112 with a credential manager module (also referred to as "credential manager") (not shown) and the agent 106, details of which are provided below. It is noteworthy that although a single block is shown for the agent 106, multiple instances of the micro-service can be executed at any given time.

In one aspect, the cloud layer 136 also includes or has access to a cloud-based storage operating system ("cloud storage OS") 140. An example of the cloud storage OS 140 is "CLOUD ON TAP" provided by NetApp Inc., the assignee of this application. (Without derogation of any trademark rights). The cloud storage OS 140 is a software defined version of the storage operating system 124 executed within the cloud layer 136 or accessible to the cloud layer 136 to provide storage and storage management options that are available via the storage system 120. The cloud storage OS 140 has access to cloud-based storage 138, which may include block-based, persistent storage that is local to the cloud storage OS 140 and object-based storage that may be remote to the cloud storage OS 140.

In another aspect, in addition to cloud storage OS 140, a cloud-based storage service is made available from the cloud layer 136 to present storage volumes and manage backups of the storage volumes. An example of the cloud-based storage service is the Cloud Volume Service, provided by NetApp Inc. (without derogation of any trademark rights). The various aspects of the present disclosure may include both the Cloud storage OS 140 and the cloud-based storage service or either one of them. Details of using the various components of the cloud layer 136 are provided below.

In aspect, the cloud layer 136 includes or interfaces with a cloud backup service ("CBS") 142 and a metadata service 178. CBS 142 is a software container that provides APIs to extend protection for an application/datastore (or VM) from the storage system 120 to cloud-based storage 138. CBS 142 assists in restoring a volume made available from cloud storage 138 to an on-premise, storage system 120, as described below in detail. The metadata service 178 stores information regarding each application/datastore/VM, policies associated with each application/VM, protection status of each application/VM and other information.

In one aspect, the SSUI 110 is loaded within the cloud manager 122 as a single page application. AngularJS, Cascading Style Sheets ("CSS") and HTML (Hyper Text Markup Language) based technologies may be used as a development framework to develop the SSUI 110. SSUI 110 can loaded using an "iFrame," an inline frame used inside a webpage to load another element. To access a storage service or manage a storage object, a client device 101 sends an authorization token to access the SSUI 110. The authorization token includes identification information of the user. The authorization token is forwarded by the SSUI 110 to an API service (not shown) that maintains or has access to authorized user information to authenticate the authorization token. The API service adds a header to the authentication token with a user account identifier, and an identifier that identifies an instance of the cloud manager 122.

Upon authentication, a tenancy service either creates or selects an "operating node" within the cloud layer 136, The operating node in this context means a computing resource (or a virtual machine) that can made available to the client 101 for a requested storage service. Thereafter, the connector module 112 is deployed within the cloud layer 136.

The storage micro-service 106 is deployed to process a request for a storage service. The storage micro-service 106 can be deployed from an elastic container registry (ECR). As an example, ECR is provided by AWS (without derogation of any third-party trademark rights) and is a managed container registry that stores, manages, and deploys container images. The storage service request is authorized by making a call to a tenancy service that determines if the user making the storage service request is authorized to request the storage service. If yes, the storage service is executed by the storage micro-service 106, as described below in detail.

In one aspect, the storage micro-service 106 includes various functional components, e.g., a discovery module 186, a recovery module 184, a workflow engine 158, a job manager 162, a protection module 180, a message polling service (also referred to as "message poller") 104, an application plugin 128, a VM plugin 127 and other plugins 196. The term plugin as used in this specification means a processor executable layer that is customized to interface with an application including a database application, a file system, an operating system, virtual machine monitor layer, VM manager 108 and others. The term protect means to backup an application/datastore/VM and/or backup associated information (including configuration information, data (e.g., files, directories, structured or unstructured data, may jointly be referred to as data containers) and others).

The application plugin 128 is configured to interface with an application for example, a database application and provides APIs to communicate with the application. The VM plugin 127 can interface with a VM monitor (e.g., a hypervisor layer) or VM manager 108. The other plugins 196 include an operating system plugin that can interface with an operating system of host VM 189, and a storage system plugin that can interface with the cloud storage OS 140 for retrieving information regarding storage objects. The term storage object means a logical object that is used to store information, e.g., a storage volume, a logical unit number (LUN), or any other object.

The protection module 180 manages and coordinates backup and cloning operations for stored objects, the recovery module 184 manages and coordinates restore operations to restore a storage object, and the discovery module 186 manages and coordinates discovery operations related to stored objects. The workflow engine 158 coordinates and manages various tasks that are performed by the different components of the storage micro-service 106. The job manager 162 executes operations for tracking the status of different jobs, including backups, cloning and restore operations, and updates the cloud manager 122. Based on the updates, data structure 122F is updated and is used to present a job status. The message poller 104 enables communication between the connector module 112 and the cloud manager 122, while communication between the connector module 112 and the management system 132 is via REST APIs.

In one aspect, host systems 102A-102N of system 100 are configured to execute a plurality of processor-executable applications 126A-126N (may also be referred to as "application 126" or "applications 126"), for example, a database application, an email server, and others. These applications may be executed in different operating environments, for example, a virtual machine environment, Windows, Solaris, Unix (without derogation of any third-party rights) and others. The applications 126 use storage system 120 to store information at storage devices, as described below. Although hosts 102 are shown as stand-alone computing devices, they may be made available from the cloud layer 136 as compute nodes executing applications 126 within VMs (shown as host VM 189).

To protect information associated with each application, for an on-premise system, a plugin module (shown as application plugins 128A-128N) are executed at host systems 102, while VM plugins 127A-127N are used to protect VMs. Each host system 102 may also execute an agent 130A-130N (like agent 106 in the cloud layer 136) that interfaces with the management module 134 of the management system 132 and the various application plugins for managing backups, restore, cloning and other operations for a non-cloud-based storage system, e.g., storage system 120. In this context the management system 132 is referred to as an "on-premise" management system. Although the management system 132 with the management module 134 is shown as a stand-alone module, it may be implemented with other applications, for example, within a virtual machine environment. Furthermore, the management system 132 and the management module 134 may also be referred to interchangeably throughout this specification.

In one aspect, the on-premise, storage system 120 has access to a set of mass storage devices 114A-114N (may also be referred to as "on-premise storage", "storage devices 114" or "storage device 114") within at least one storage subsystem 116. The storage devices 114 may include writable storage device media such as solid-state drives, storage class memory, magnetic disks, video tape, optical, DVD, magnetic tape, non-volatile memory devices, for example, self-encrypting drives, or any other storage media adapted to store structured or non-structured data. The storage devices 114 may be organized as one or more groups of Redundant Array of Independent (or Inexpensive) Disks (RAID). The various aspects disclosed are not limited to any specific storage device or storage device configuration.

The storage system 120 provides a set of storage volumes directly to host systems 102 via the connection system 118. As mentioned above, for VMs, each storage volume is mapped to a datastore to store data using the mapped storage volumes. The cloud storage OS 140 can also present the storage volumes, and in that context a storage volume is referred to as a "cloud volume." The storage operating system 124/cloud storage OS 140 present or export data stored at storage devices 114/cloud storage 138 as a volume (or a logical unit number (LUN) for storage area network ("SAN") based storage). Each volume/datastore or cloud volume is a logical object, also referred to as a storage object, configured to store data files (or data containers or data objects), scripts, word processing documents, executable programs, and any other type of structured or unstructured data. From the perspective of one of the client systems, each volume can appear to be a single storage drive. However, each volume can represent the storage space in one storage device, an aggregate of some or all the storage space in multiple storage devices, a RAID group, or any other suitable set of storage space.

The storage system 120/cloud storage OS 140 are used to store and manage information at storage devices 114/cloud storage 138 based on a request generated by application 126, user 101 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests are sent over connection system 118 to the storage system 120 or the cloud storage OS 140, based on the request. Storage system 120/cloud storage OS 140 receives the I/O requests, issues one or more I/O commands to storage devices 114/cloud storage 138 to read or write the data on behalf of the host system 102 and issues a response containing the requested data over the network 118 to the respective host system 102.

Although storage system 120 is shown as a stand-alone system, i.e., a non-cluster-based system, in another aspect, storage system 120 may have a distributed architecture; for example, a cluster-based system that may include a separate network module and storage module. Briefly, the network module is used to communicate with host systems 102, while the storage module is used to communicate with the storage devices 114.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

In one aspect, the storage system 120 can be organized into any suitable number of virtual servers (may also be referred to as "VServers" or storage virtual machines ("SVMs")), in which each VServer represents a single storage system namespace with separate network access. Each VServer may also be referred to as a working environment. Each VServer has a specific client domain and a security domain that are separate from the client and security domains of other VServers. Moreover, each VServer can span one or more physical nodes, each of which can hold storage associated with one or more VServers. Client systems 101 can access the data on a VServer from any node of the clustered system, through the virtual interface associated with that VServer. It is noteworthy that the aspects described herein are not limited to the use of VServers.

As an example, one or more of the host systems (for example, 102A-102N) or a compute resource (not shown) of the cloud layer 130 may execute a VM environment where a physical resource is time-shared among a plurality of independently operating processor executable VMs (including host VM 189). Each VM may function as a self-contained platform, running its own operating system (OS) and computer executable, application software. The computer executable instructions running in a VM may also be collectively referred to herein as "guest software." In addition, resources available within the VM may also be referred to herein as "guest resources."

The guest software expects to operate as if it were running on a dedicated computer rather than in a VM. That is, the guest software expects to control various events and have access to hardware resources on a physical computing system (may also be referred to as a host system) which may also be referred to herein as "host hardware resources." The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

Figure 1B:
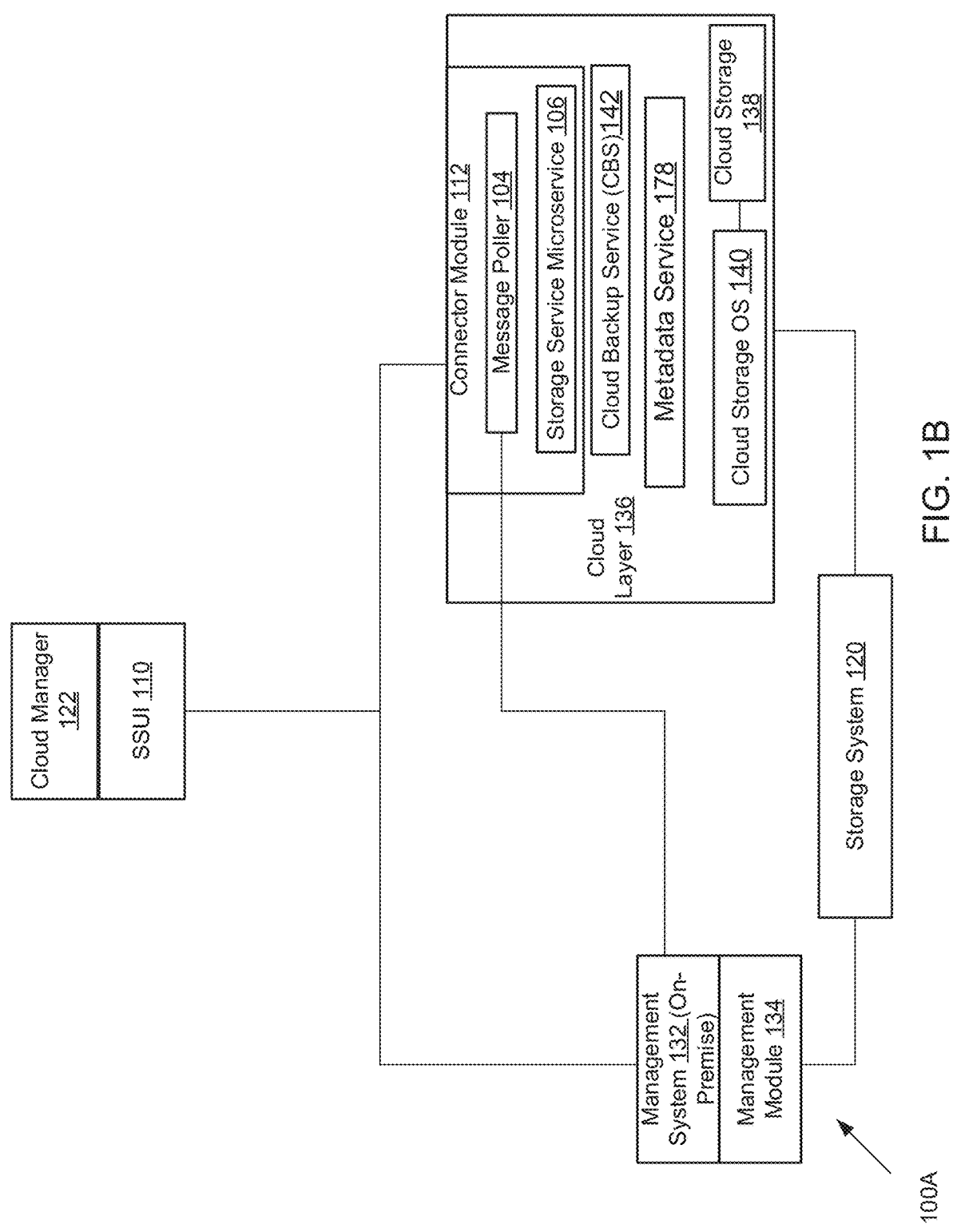
FIG. 1B shows an example of using cloud platforms and on-premise data centers, according to one aspect of the present disclosure.

FIG. 1B shows an example of a system 100A, according to one aspect of the present disclosure. The various common components of system 100 and system 100A are not described again. In system 100A. the message poller 104 interfaces with the management system 132 for protecting applications/VMs, as described below in detail.

Process Flows: FIG. 1C shows a process 105 for hybrid protection of applications/VMs, according to one aspect of the present disclosure. Process 105 begins in block B107, when a user system 101 is connected to the cloud manager 122 via a network connection, e.g., using the connection system 118 (FIG. 1A). The user system 101 logs into the cloud manager 122 with user credentials (e.g., a username and password). The cloud manager 122 authenticates the user using the data structure 122A. If the user does not have an account, one is created via the cloud manager 122 or a user interface is provided directly by the cloud provider 161. If the user account is not associated with the storage micro-service 106, then one is provisioned/assigned from the cloud manager 122. The SSUI 110 is loaded using a uniform resource locator (URL) for the SSUI 110. To access services offered by the cloud manager 122, additional authentication may be performed. For example, an authorization token is received from the user 101 for a storage service. The token may identify a network domain, a client identifier, and a destination. The token is authenticated by the cloud manager 122 or by any other module.

In block B109, a user interface (e.g., SSUI 110) is presented to a user. The user may select an application, a VM or both an application or VM for hybrid protection i.e., using both the management system 132, and the storage micro-service 106/the CBS 142 of the cloud layer 136.

In block B111, a discovery operation is executed. The discovery operation is executed by the discovery module 186 of agent 106 interfacing with the management system 132 via REST APIs. For a selected application, the application name, a storage system (i.e., a working environment) identifier storing data for the application, a storage volume identifier identifying the storage volume (or volumes) that store data for the application, a storage path for the identified storage volume(s), and any other relevant information is retrieved from the management system 132. For a selected VM, a VM identifier, a VM monitor 108 identifier, the size and name of files for the VM, the storage volume (s) information where the VM files are stored including storage paths, datastore(s) mapped to the storage volumes and any other relevant information is retrieved. Furthermore, the discovery operation also collects information regarding the working environment associated with the selected application/VM. The working environment in this context means the storage system 120 or a clustered based storage system having a plurality of storage system nodes in each storage system cluster. The information regarding the working environment includes a storage system 120 or cluster identifier including VServer identifier, file system identifiers for the storage volumes used by the application/VM and any other information.

In block B113, the CBS 142 registers the working environment(s) for the selected application/VM. In block B115, a policy is assigned to the selected application/VM for hybrid protection, which means that a copy of the backup of the application and its associated data/VM will be stored at the storage system 120 and at the cloud-based storage 138, i.e., the single policy enables hybrid protection. It is noteworthy that the policy for the VM is associated with the datastore used by the VM to store data at a storage volume mapped to the datastore. In block B117, the CBS 142 generates a job object to track the hybrid protection status of the application/VM. In block B119, an indicator is updated to indicate the hybrid protection status of the application/VM both at the storage system 120 and cloud-based storage 138.

FIG. 1D shows a process 131 to restore a VM from cloud-based backup, according to one aspect of the present disclosure. The process 131 begins in block B133, when a user system 101 is connected to the cloud manager 122 via a network connection, e.g., using connection system 118 (FIG. 1A). The user 101 logs into the cloud manager 122 with user credentials (e.g., a username and password). The cloud manager 122 using the data structure 122A authenticates the user. If the user does not have an account, one is created via the cloud manager 122 or a user interface is provided directly by the cloud provider 161. If the user account is not associated with the storage micro-service 106, then one is provisioned/assigned from the cloud manager 122. The SSUI 110 is loaded using a uniform resource locator (URL) for the SSUI 110. To access services offered by the cloud manager 122, additional authentication may be performed. For example, an authorization token is received from the user 101 for a storage service. The token may identify a network domain, a client identifier, and a destination. The token is authenticated by the cloud manager 122 or by any other module.

In block B135, a user interface (e.g., SSUI 110) is presented to a user. The user may select a VM and a backup of a datastore used by the VM for a restore operation to restore the VM from a cloud-based backup copy to on-premise storage. The CBS 142 then generates a job object to track the restore operation.

In block B137, the CBS 142 calls a pre-restore API. In one aspect, CBS 142 instructs the VM plugin 127 to call the pre-restore API. The VM plugin 127 interfaces with the VM manager 108, obtains VM details (e.g., a VM identifier, storage location of storage volumes used by the VM, access control information related to the VM or any other information). The VM plugin 127 requests the VM manager 108 to unregister the selected VM. Thereafter, after the VM is unregistered, in block B139, a single file restore API is initialized to restore the VM from a cloud-based backup to the storage system 120.

In block B141, after the restore phase of the restore operation is completed, a post-restore API is initialized to rename VM files in a post restore phase of the restore operation. The restored VM is then re-registered with the VM manager 108 and in block B143, the restore operation status at the job object created by CBS 142 in block B135 is updated to indicate that the restore operation is complete.

Figure 1E:
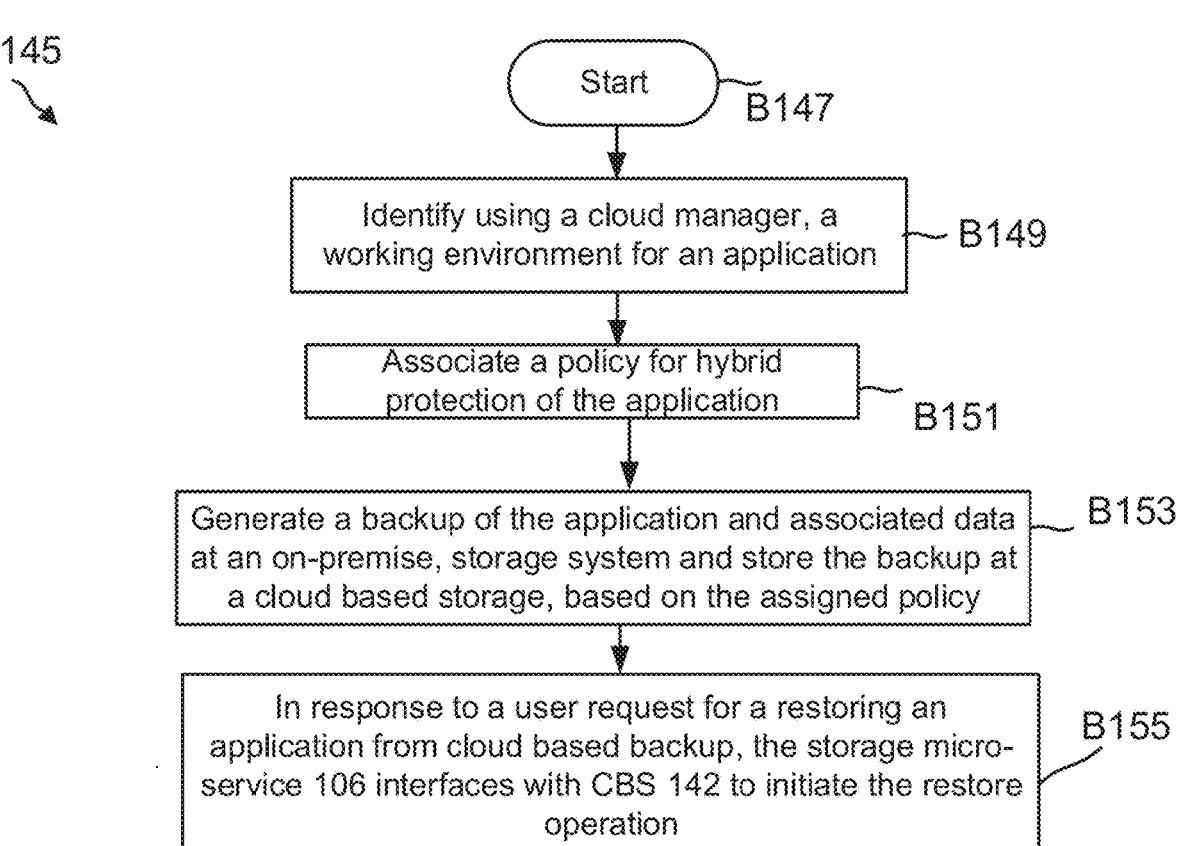
FIG. 1E shows a process for setting a hybrid protection policy to protect an application, according to one aspect of the present disclosure.

FIG. 1E shows a process 145 to generate a policy for hybrid protection of an application and generating a backup of the application data and configuration, according to one aspect of the present disclosure. The process 145 begins in block B147, when a user system 101 is connected to the cloud manager 122 via a network connection, e.g., using connection system 118 (FIG. 1A). The user 101 logs into the cloud manager 122 with user credentials (e.g., a username and password). The cloud manager 122 using the data structure 122A authenticates the user. If the user does not have an account, one is created via the cloud manager 122 or a user interface is provided directly by the cloud provider 161. If the user account is not associated with the storage micro-service 106, then one is provisioned/assigned from the cloud manager 122. The SSUI 110 is loaded using a uniform resource locator (URL). To access storage services, additional authentication may be performed. For example, an authorization token is received from the user 101 for a storage service. The token may identify a network domain, a client identifier, and a destination. The token is authenticated by the cloud manager 122 or by any other module. The user selects an application for hybrid protection.

In block B149, application details are obtained by the discovery module 186 of agent 106 from the application plugin 128 executed by the management system 132. The management system 132 returns information regarding the working environment, e.g., the storage system 120 (including a VServer used by the application), as well as the identity and location of the storage volumes used by the application. The working environment is then registered with the cloud manager 122.

In block B151, CBS 142 associates a policy with the application to enable hybrid protection for the application. The storage volumes for the application are grouped by the working environment. For example, if a first storage system with multiple volumes is used to store application data, then those volumes are treated as a logical group for protection. This improves the system's ability to efficiently protect data at a group level. Thereafter, CBS 142 generates a job object to track the protection status of the application, at both on-premise storage and cloud-based storage 138.

In block B153, based on the assigned policy, a backup of the group volumes for the application is generated. In one aspect, the backup is taken by the storage system 120 interfacing with the application plugin 128 and the other plugins 196 executed by the management system 132. The backup is copied by CBS 142 to the cloud-based storage 138 for hybrid protection. In block B155, the cloud manager 122 notifies the storage micro-service 106 of a user selection to restore application data to an on-premise location managed by the storage system 120 from a backup stored at the cloud-based storage 138. The storage service micro-service 106 communicates with the CBS 142 to initiate a first phase of the restore operation. Details of the first phase of the restore operation are shown in FIG. 1F, described below in detail.

As shown in FIG. 1F, in block 155A, the storage micro-service 106 retrieves a working environment identifier (e.g., a VServer identifier) for the application data and the volume identifier(s) that identify the source volumes storing application data. This information is associated with a backup identifier that identifies the backup selected by the user. The storage micro-service 106 maintains this information or has access to this information. The storage micro-service 106 then requests the CBS 142 to restore the application data at an alternate location within the same aggregate managed by the same VServer that stores the application data at the on-premise location.

In block 155B, CBS 142 generates a first job object to track the first phase of the restore operation by the storage system 120. The first job object is identified by an identifier, which is provided to the storage micro-service 106. This enables the storage micro-service 106 to poll the job object for status of the first phase of the restore operation. Thereafter, in block 155C, CBS 142 notifies the storage system 120 via a REST API to restore the storage volumes to the alternate location.

In block 155D, the storage system 120 interfacing with the cloud storage OS 140 retrieves the cloud-based backup and restores the application data at an alternate volume managed by the storage system 120. The storage system 120 notifies CBS 142 upon completion of the first phase of the restore operation and CBS 142 updates the status of the job object to indicate that the first phase of the restore operation is complete. Thereafter, in block B157, the storage micro-service 106 determines that the first phase is complete, upon polling the first job object. The storage micro-service 106 then instructs the management system 132 to execute a second phase of the restore operation to restore and recover the application from the alternate volume to the source volume. Details of the second phase are shown in FIG. 1G, described below in detail.

FIG. 1G shows the process block B157 to restore and recover the application from the alternate location to the source location of the application data. In block 157A, the storage micro-service 106 provides a backup name with a mapping of source volumes to the alternate volumes at the alternate location for the second phase of the restore operation to restore and recover the application. This phase is also referred to as a restore and recovery operation. The backup name is obtained from the user request, while the source volume information is maintained by the storage micro-service 106 for the application. In response, in block 157B, the management system 132 provides a job object, referred to as the second job object to the storage micro-service 106. The management system 132 maintains the second job object to the track the second phase and the storage micro-service 106 can poll the second object to track progress of the second phase.

In block 157C, the management system 132 interfacing with agent 130 (FIG. 3N/3O) restores and recovers the application at the source volume. In one aspect, the application plugin 128 copies application data from the alternate volume location to the source location and recovers the application. The management system 132 updates the status of the second phase of the restore and recovery operation to indicate that the second phase is complete. In block 157D, the storage micro-service 106 polls the second job object to determine that the second phase involving restore and recovery of the application is complete. The storage micro-service 106 then requests the management system 132 to delete the alternate volume(s). The alternate volume(s) is then deleted. Thereafter, in block 157E, the client system is notified that the application has been restored and recovered and access to the restored/recovered application is made available.

FIG. 1H shows a process 161, according to one aspect of the present disclosure. The process 161 begins in block B163, when a user system 101 is connected to the cloud manager 122 via a network connection, e.g., using connection system 118 (FIG. 1A). The user 101 logs into the cloud manager 122 with user credentials (e.g., a username and password). The cloud manager 122 using the data structure 122A authenticates the user. If the user does not have an account, one is created via the cloud manager 122 or a user interface is provided directly by the cloud provider 161. If the user account is not associated with the storage micro-service 106, then one is provisioned/assigned from the cloud manager 122. The SSUI 110 is loaded using a uniform resource locator (URL). To access storage services, addi-tional authentication may be performed. For example, an authorization token is received from the user 101 for a storage service. The token may identify a network domain, a client identifier, and a destination. The token is authenti-cated by the cloud manager 122 or by any other module.

In block B165, using the cloud manager 122, a user selects a datastore for hybrid protection. As mentioned above, the datastore is mapped to a storage volume that is used by one or more VMs to store data. The working environment, e.g., the storage system 120 is registered with the cloud manager 122.

In block B167, a uniquely identified policy to provide hybrid protection for the datastore (and hence the VMs that use the datastore) is created/assigned. The policy defines the number of backup copies for cloud-based storage 138 that are to be maintained, a frequency of backing up of the datastore by the on-premise management system 132 and saving a copy of backup at cloud based storage 138. CBS 142 creates a job object to indicate the protection status of the datastore.

In block B169, a datastore backup is generated by the on-premise management system 132. The datastore backup is copied to the cloud-based storage 138 by the CBS 142, based on the policy associated with the datastore/VM.

In block B171, a pre-restore API is called for a pre-restore phase of a restore operation to restore the VM from a cloud-based backup of the datastore to an on-premise stor-age location. As an example, agent 106 calls the pre-restore API from VM plugin 127 at the on-premise management system 132. The VM is unregistered by the VM management module 108 and then CBS 142 is notified that the pre-restore phase/operation is complete. By unregistering the VM, the VM data for the restore operation is not changed.

In block B173, CBS 142 creates a copy of VM files from the cloud-based backup of the datastore used by the VM to an on-premise storage location. The copied VM files are used to complete a restore phase of the restore operation using a restore API used by the VM plugin 127 at the management system 132. Once the restore phase of the restore operation is completed, the VM is re-registered by the VM manager 108 in block B175.

Figure 2A:
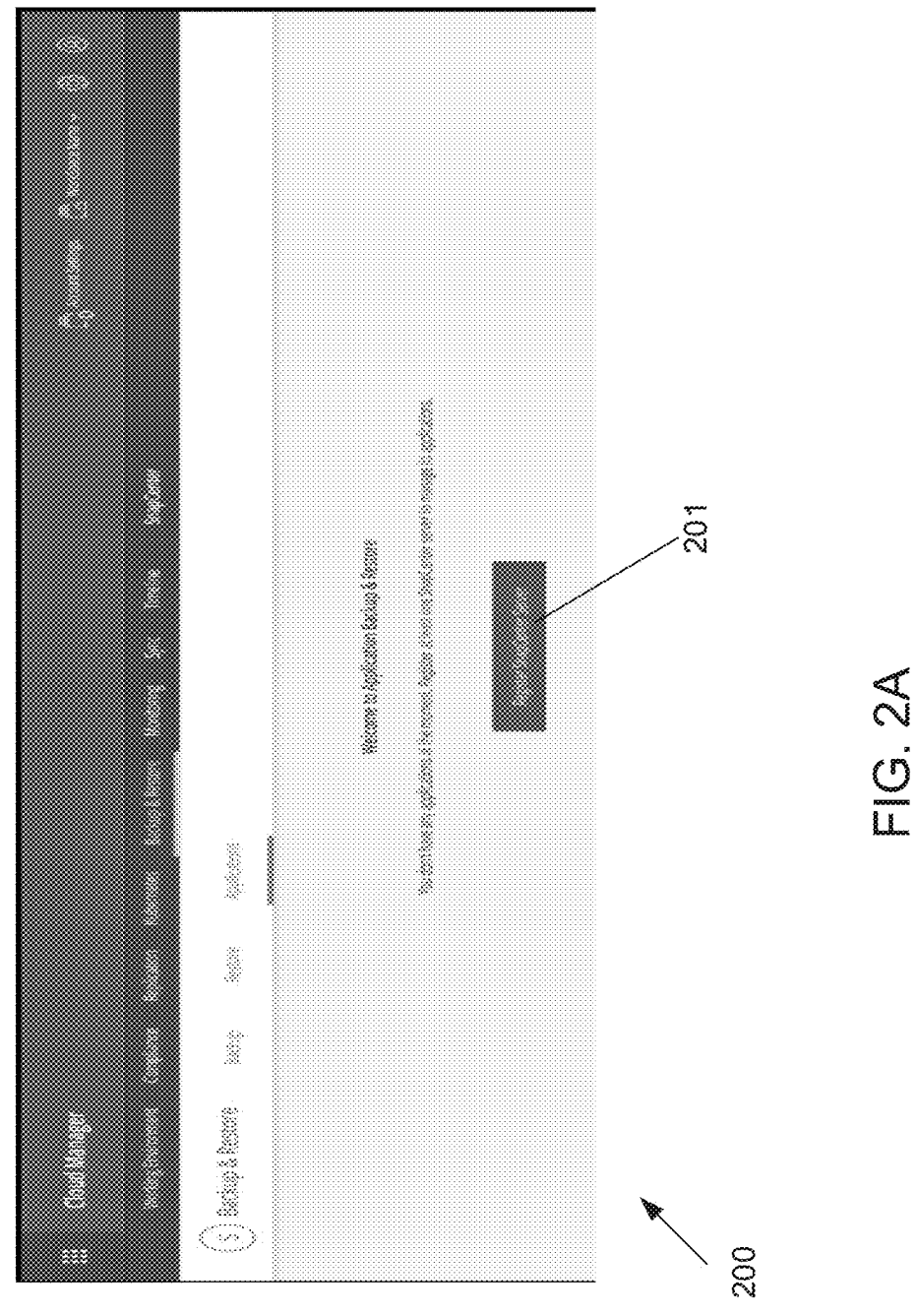
FIG. 2A shows an example of a welcome screen to register an on-premise management system, according to one aspect of the present disclosure.

Screen Shots: FIGS. 2A-2I show various screen shots for proving hybrid protection for applications from the cloud manager 122, according to one aspect of the present disclo-sure. FIG. 2A shows an example of a screen shot 200 with a welcome icon 201 for registering the management system 132 for backup and restore of an application using the storage system 120 and/or the cloud-based storage 138. Icon 201 is used to register the management system 132 with the CBS 142/cloud manager 122 for protecting and restoring application data.

Figures 1, 2B:
FIG. 2B-1 shows an example of a screen shot with a listing of policies for applications, according to one aspect of the present disclosure.

FIG. 2B-1 shows an example of a screen shot 202 with a selectable option 203 that provides an option 203A to create a policy for an application. Segment 203B provides a list of policies identifying a policy name, a mirroring label (shown as "SnapMirror label", without derogation of any trademark rights of NetApp Inc.), a retention count and a backup source. The mirroring label indicates mirroring a snapshot from on-premise storage to cloud-based storage. Application policy details are shown in screenshot 202A of FIG. 2B-2.

Figures 2, 2B:
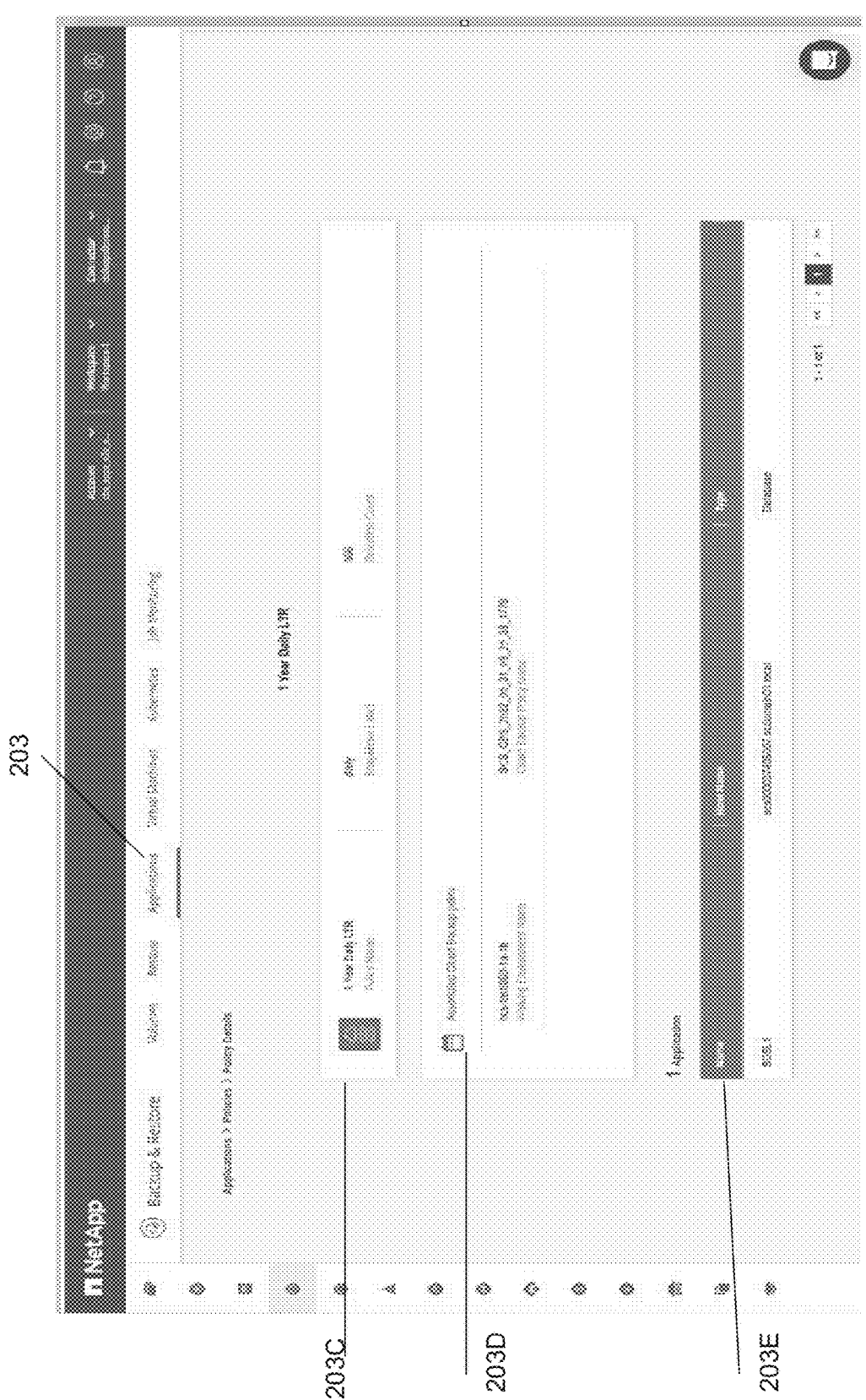

Segment 203C of FIG. 2B-2 shows high level policy details and segment 203D shows an associated cloud policy with a working environment identifier to enable hybrid protection. Segment 203E shows application details, e.g., a name, a host name and application type.

Figure 2C:
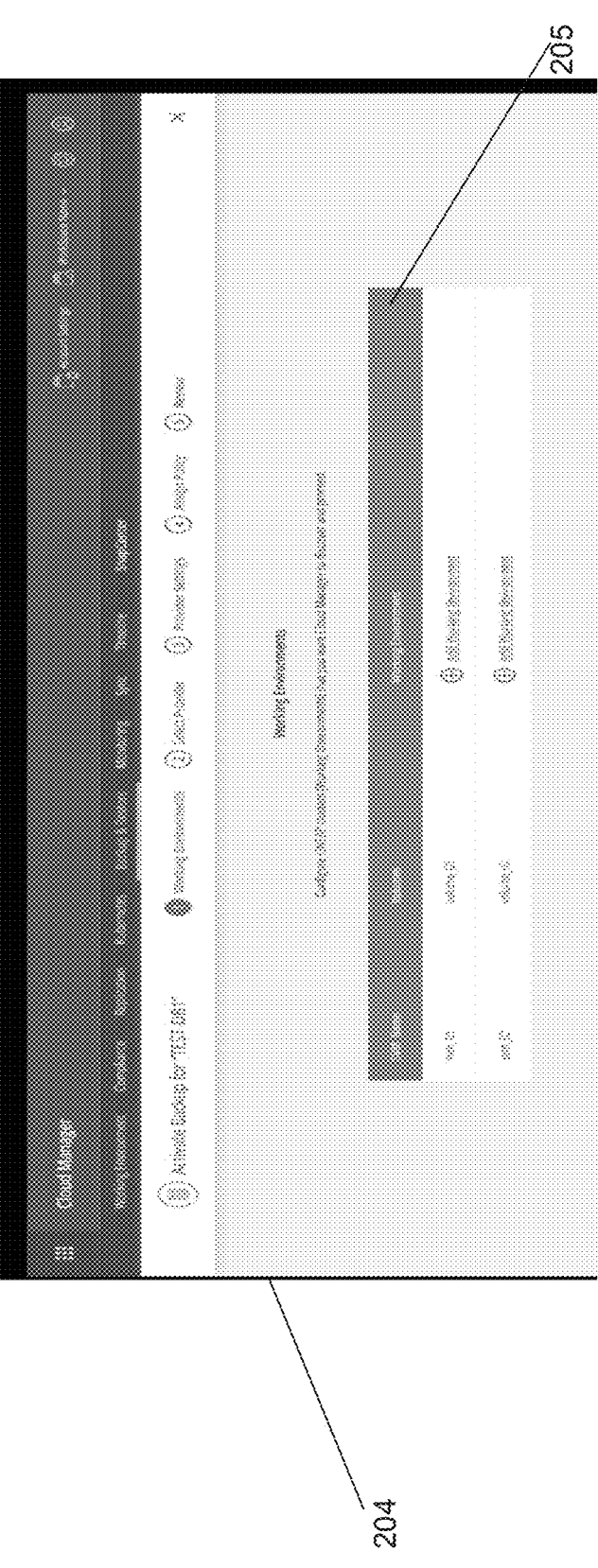
FIG. 2C shows an example of a screen for registering a working environment, according to one aspect of the present disclosure.

FIG. 2C shows an example of a screen shot 204 to configure working environments by the cloud manager 122. The working environment lists a storage volume and a Vserver (shown as SVM) used for an application to store data in segment 205.

Figure 2D:
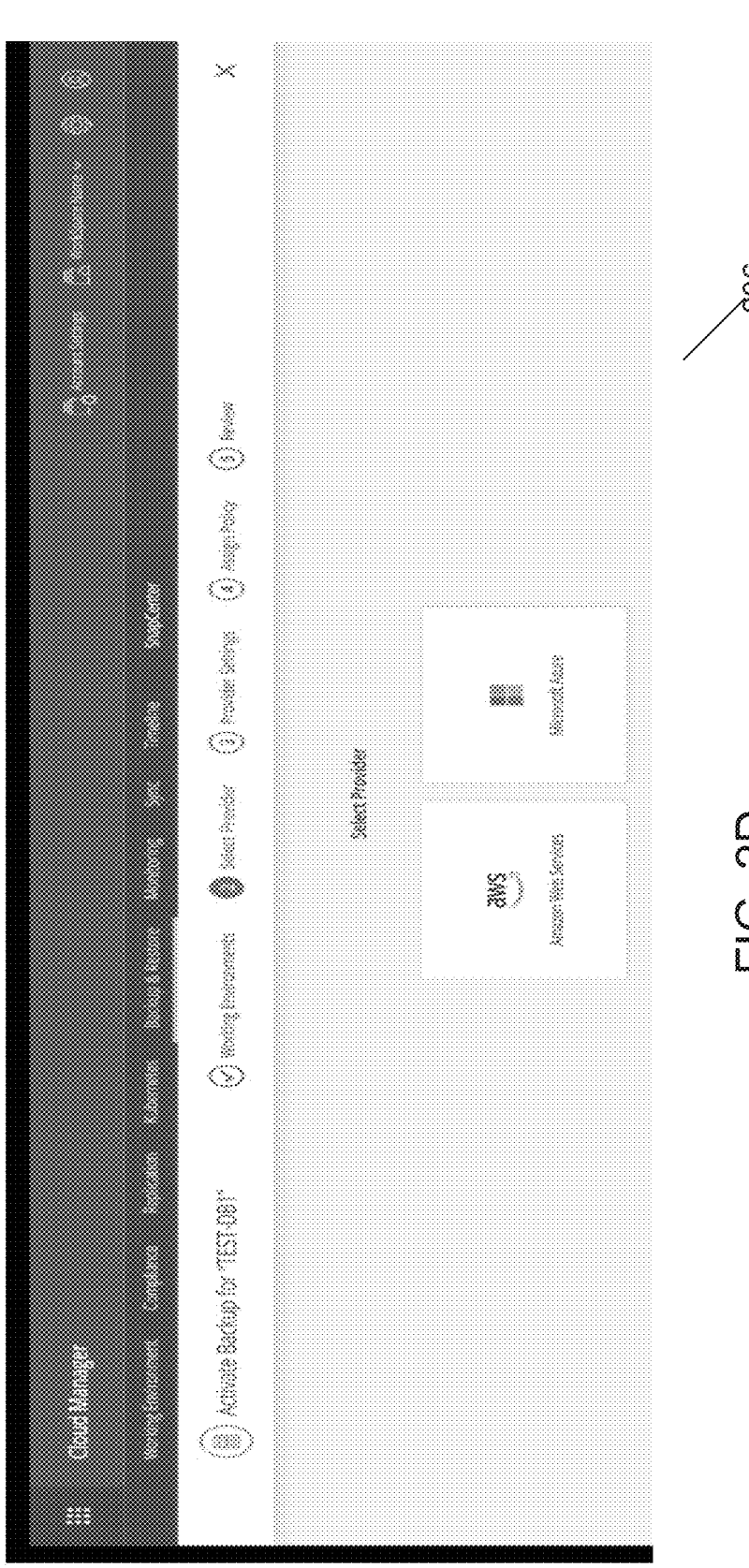
FIG. 2D shows an example of a screen for configuring a cloud provider, according to one aspect of the present disclosure.
Figure 2E:
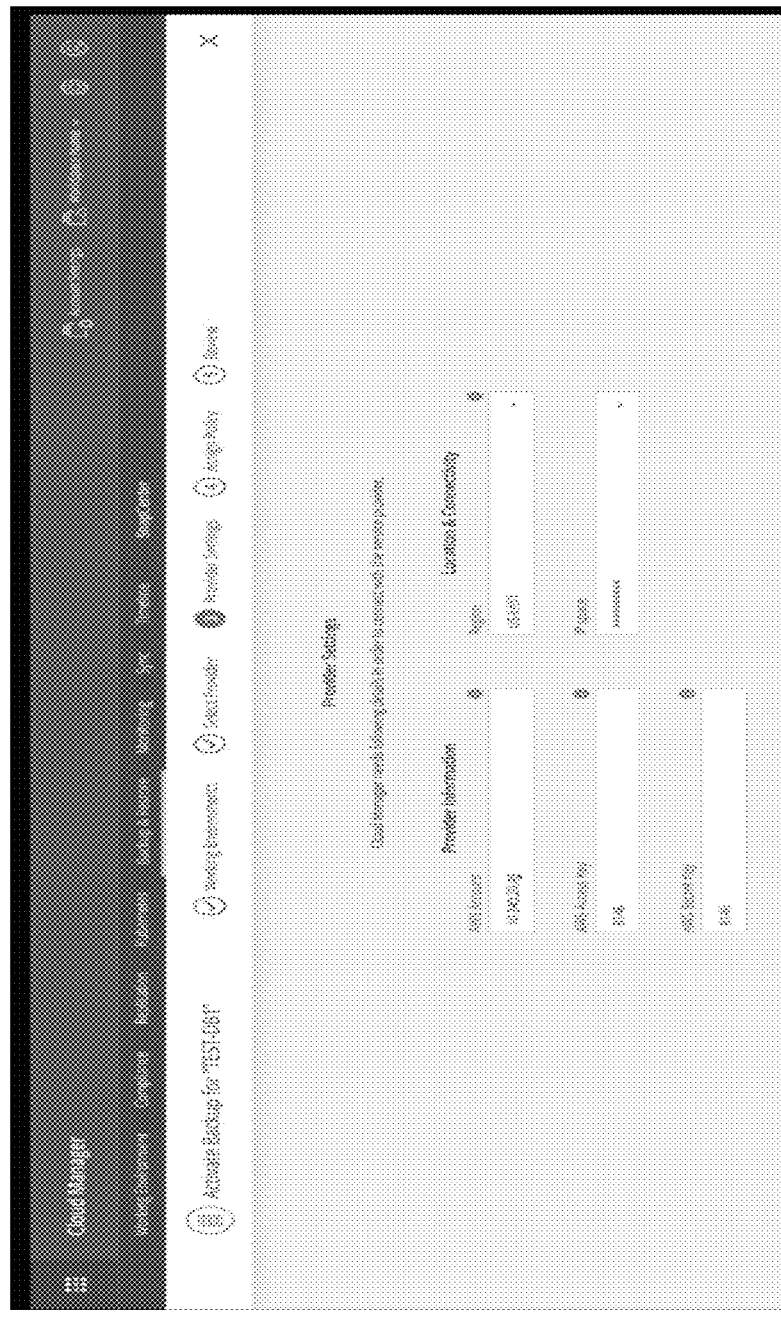
FIG. 2E shows an example of a cloud provider setting, according to one aspect of the present disclosure.

FIG. 2D shows an example of a screenshot 206 to configure a cloud provider for the working environment, e.g., AWS or Azure in this example. Once the user selects the option, the cloud manager 122 presents a screen shot 208 in FIG. 2E that provides examples of cloud provider settings, e.g., name, location, connectivity, IP space information and access key.

Figure 2F:
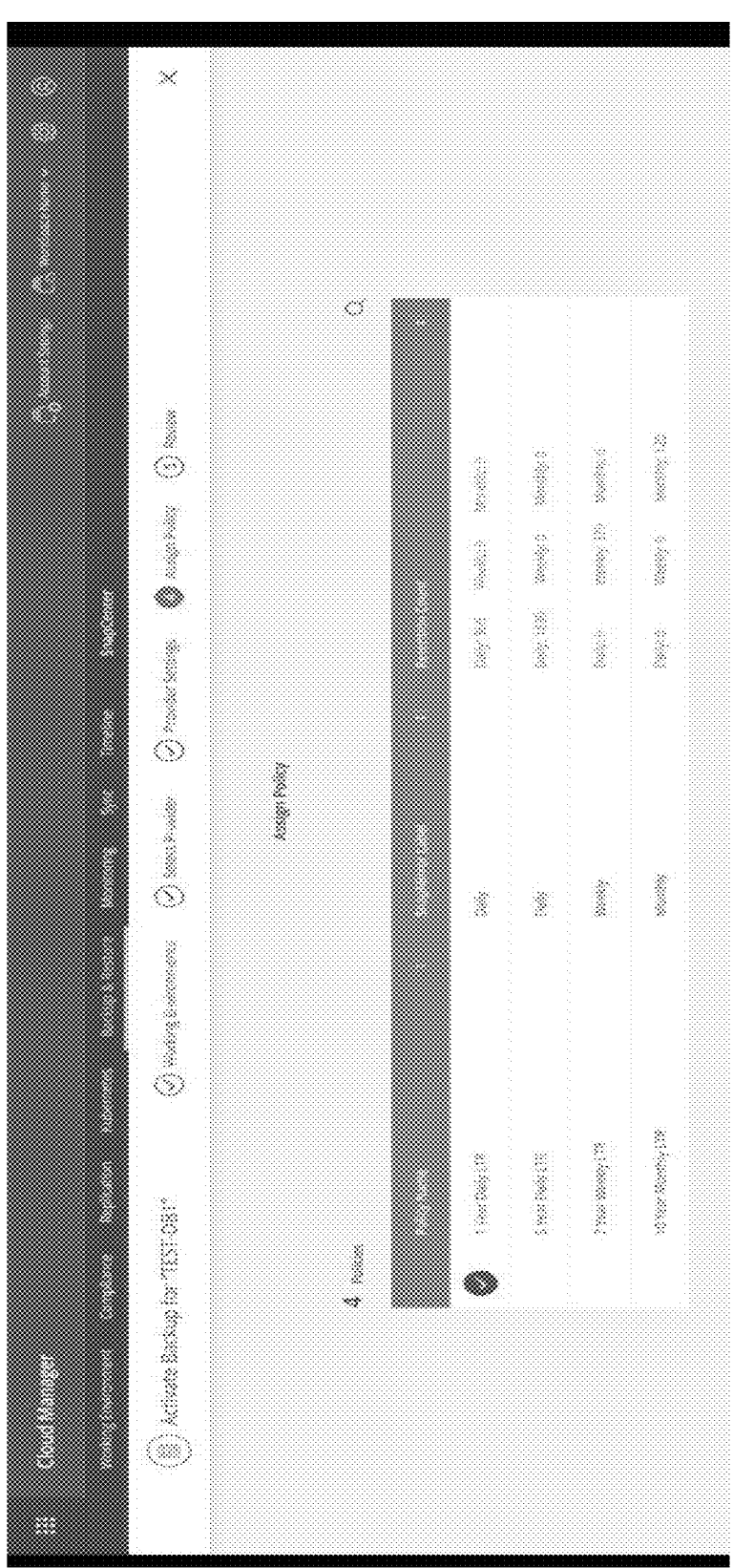
FIG. 2F shows an example of assigning a policy to an application, according to one aspect of the present disclosure.

FIG. 2F shows an example of a screen shot 210 that enables a user to assign a CBS policy for hybrid protection of application data. The policy includes a "SnapMirror" label that indicates how often data is mirrored from the on-premise storage system 120 to cloud storage 138.

Figure 2G:
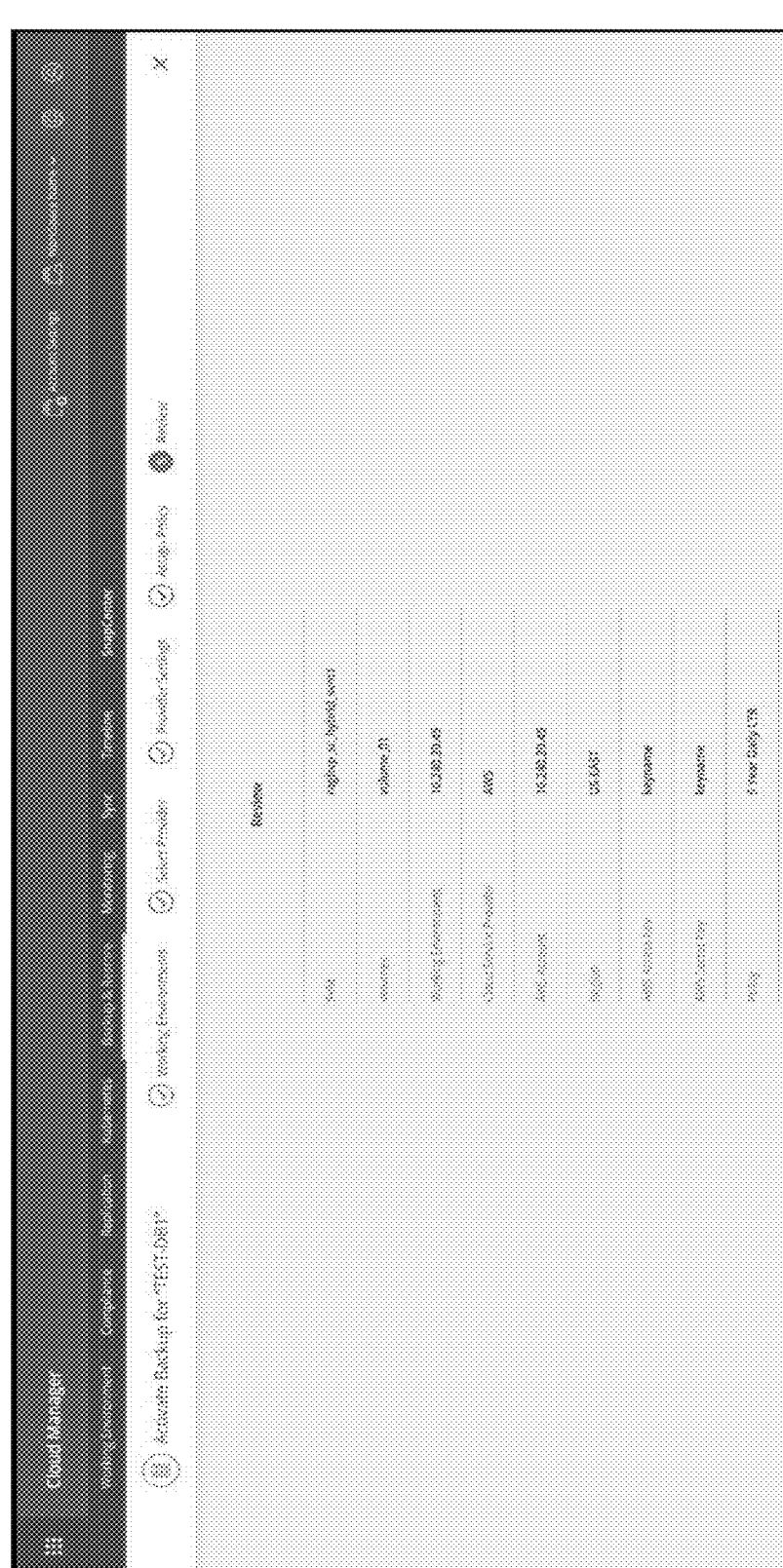
FIG. 2G shows an example of a review screen after a policy is assigned to the application, according to one aspect of the present disclosure.

FIG. 2G provides an example of a summary page 212 backup and restore of an application using hybrid protection. The summary page identifies the VServer for the applica-tion, the volumes used by the application to store data, the working environment, and details of the cloud provider.

Figure 2H:
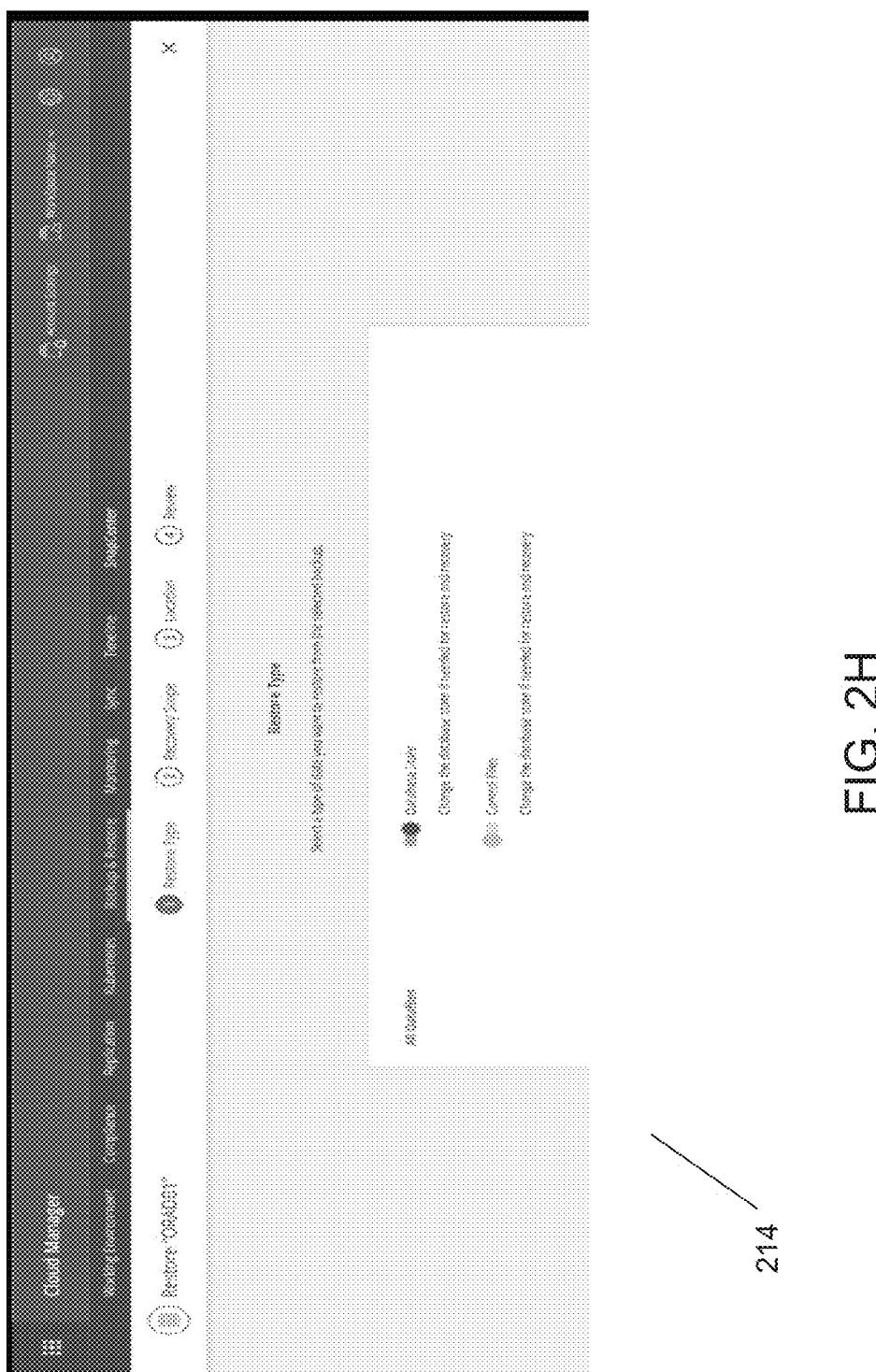
FIG. 2H shows an example of a screen to select a restore operation for an application, according to one aspect of the present disclosure.
Figure 21:
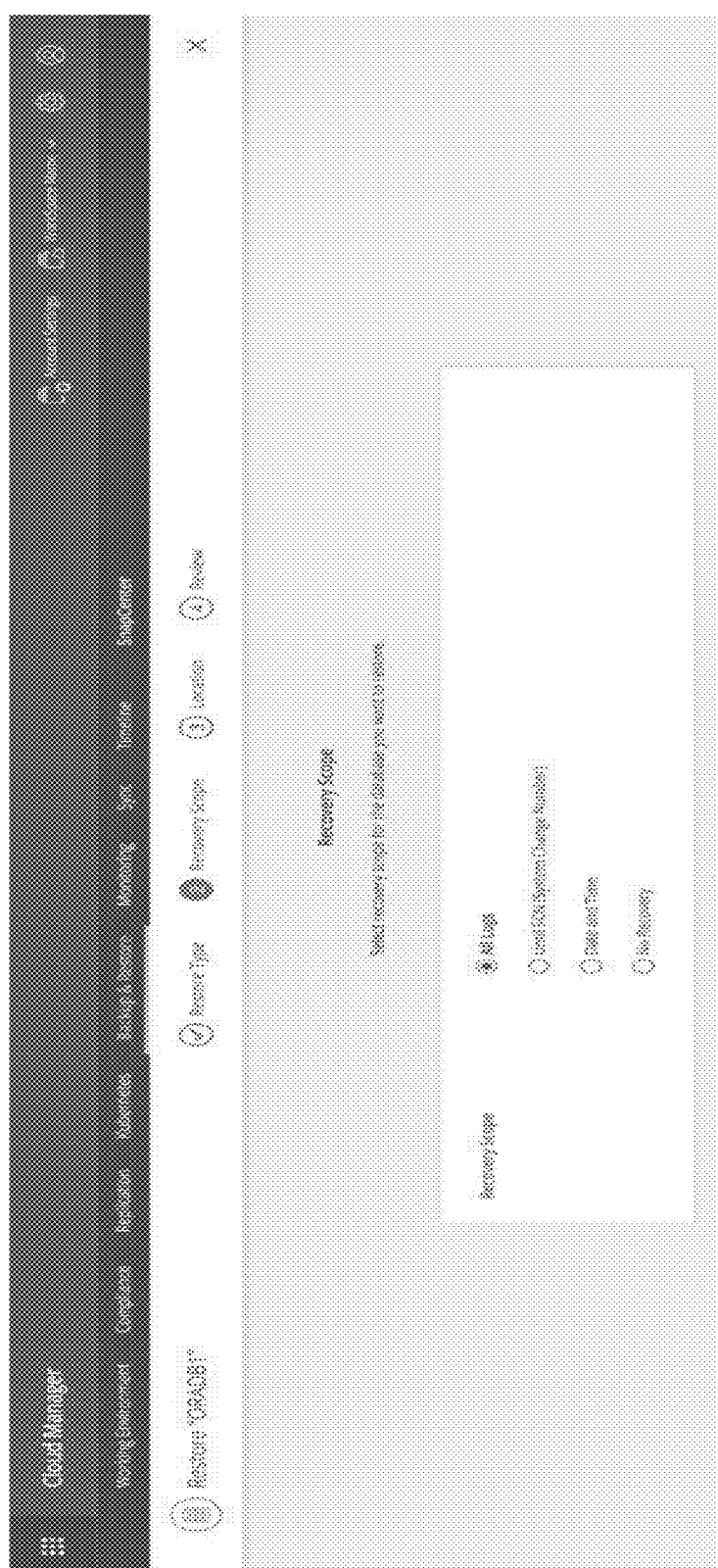
Figure 2J:
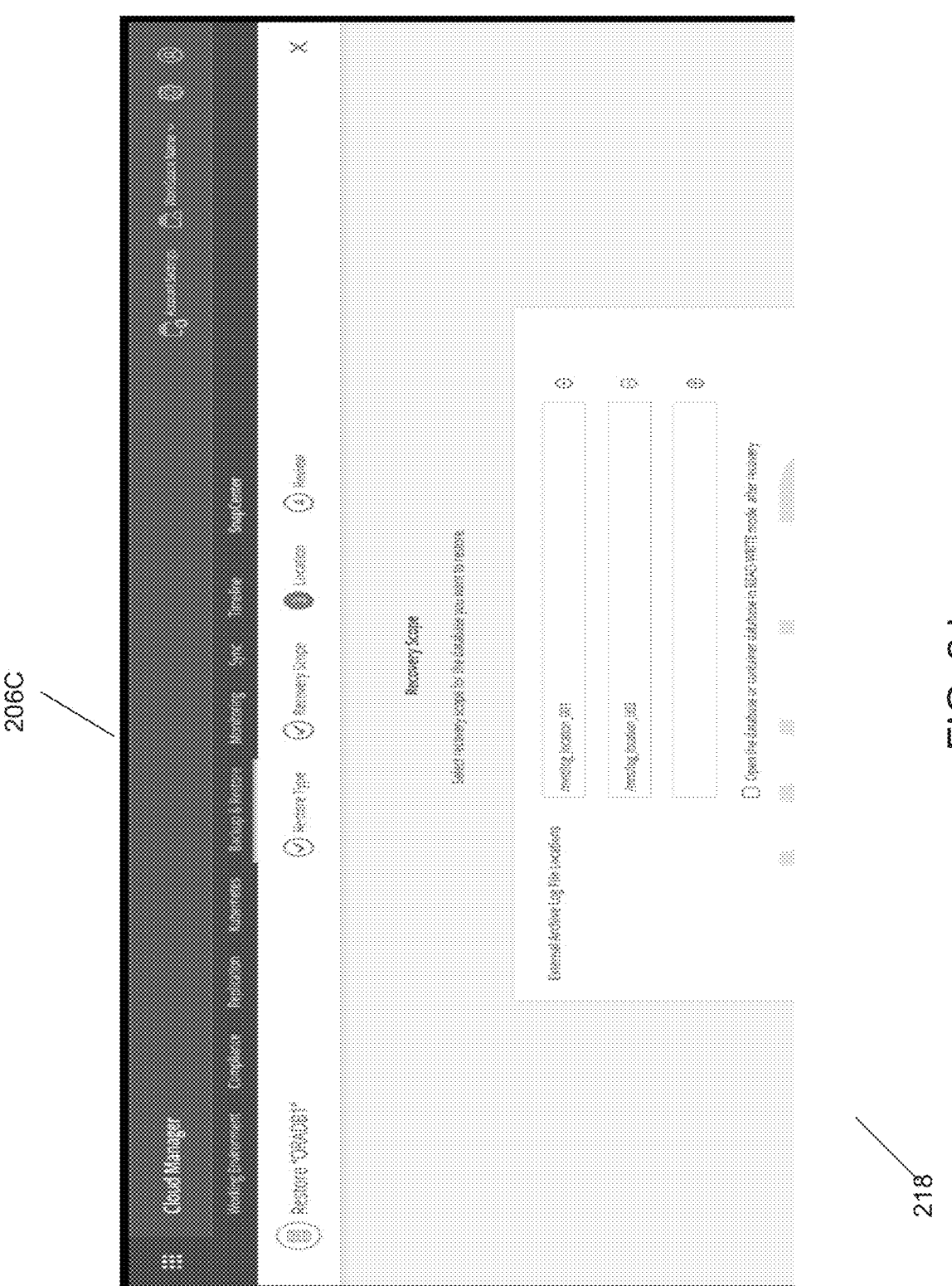
FIG. 2J shows an example of a screen that presents an option to select the restore operation scope, according to one aspect of the present disclosure.
Figure 2K:
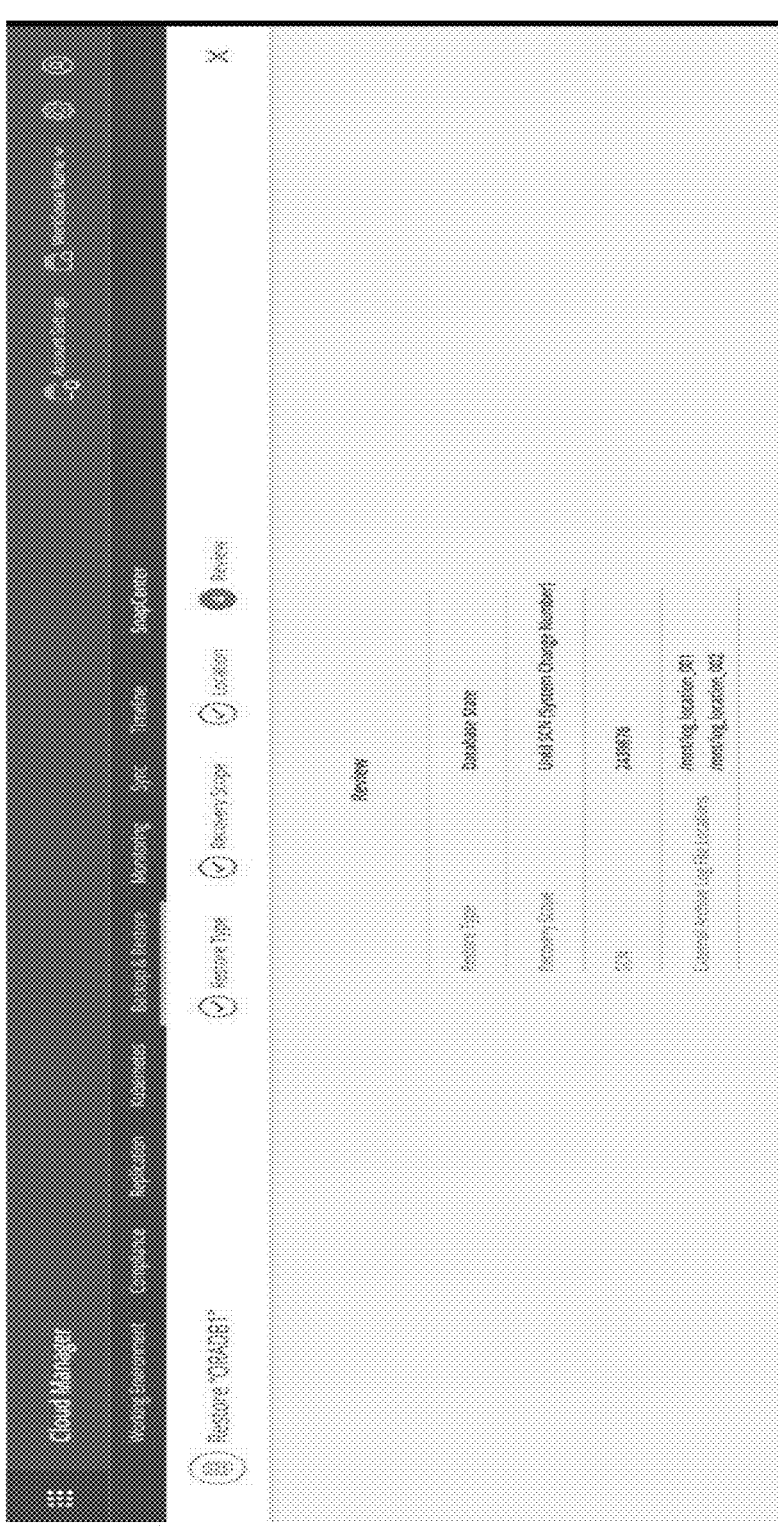
FIG. 2K shows an example of a screen that presents the overall view of the restore operation upon completion, according to one aspect of the present disclosure.

FIG. 2H shows an example of a screen shot 214 for restoring an application, in this example, an Oracle database (without derogation of any trademark rights). FIG. 2I shows an example of a screen shot 216 that enables a user to select the scope of the restore operation, e.g., providing selectable options that include restoring all database logs. FIG. 2J shows an example of a screen shot 218 indicating the log file locations for the restore operation. FIG. 2K shows a sum-mary page 220 for the restore operation. The summary page indicates the restore type, the restore scope, and the location of log files.

Figure 3A:
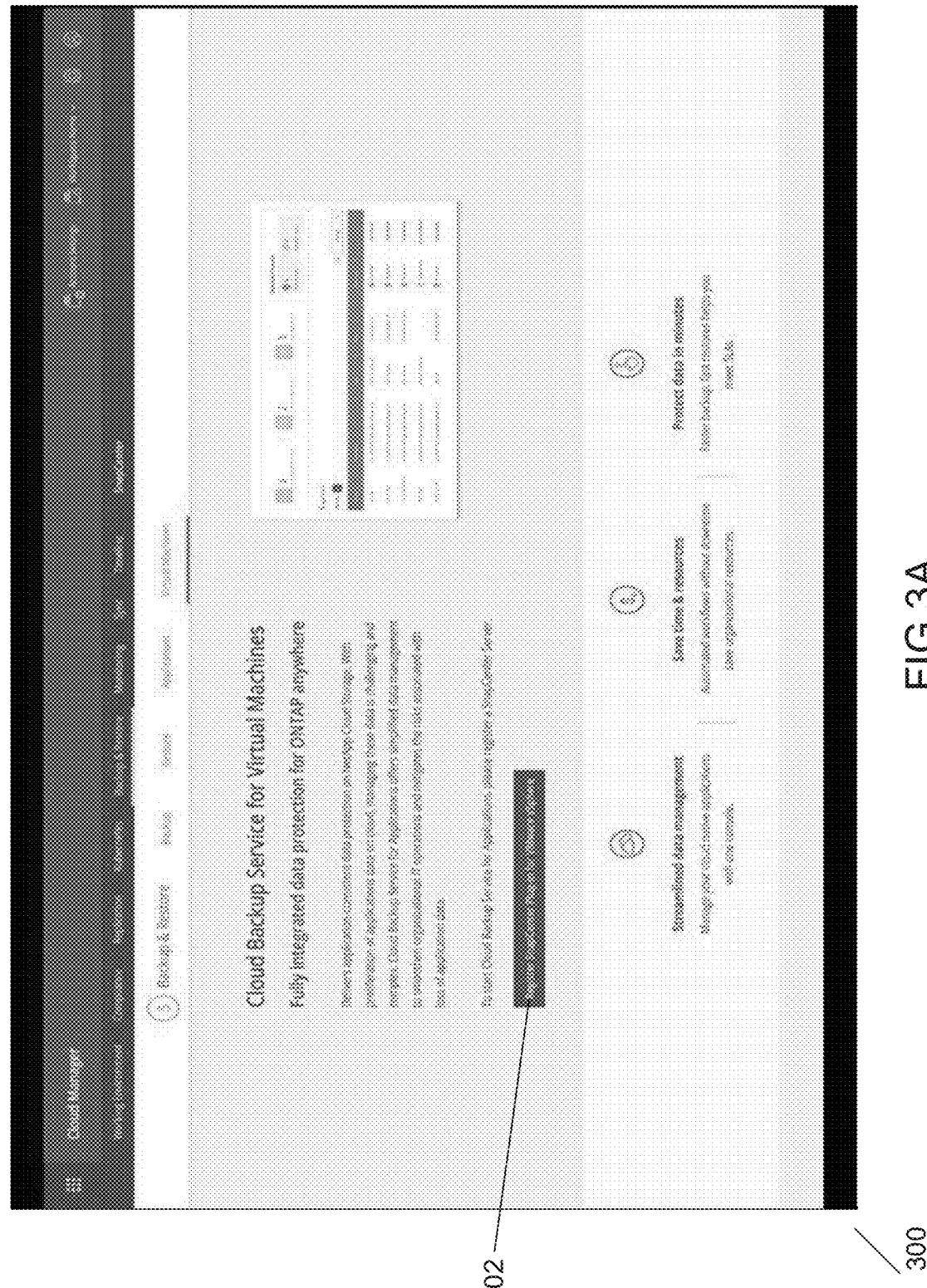
FIG. 3A shows an example of a welcome screen for hybrid protection of virtual machines, according to one aspect of the present disclosure.

FIGS. 3A-3M shows example of screenshots for provid-ing hybrid protection to VMs, using the innovative technol-ogy disclosed herein. FIG. 3A shows an example of an introductory screen 300 with a selectable option 302 to register a VM plugin 127 of the management system 132 by the cloud manager 122 to assist in executing the process blocks described above in detail.

Figure 3B:
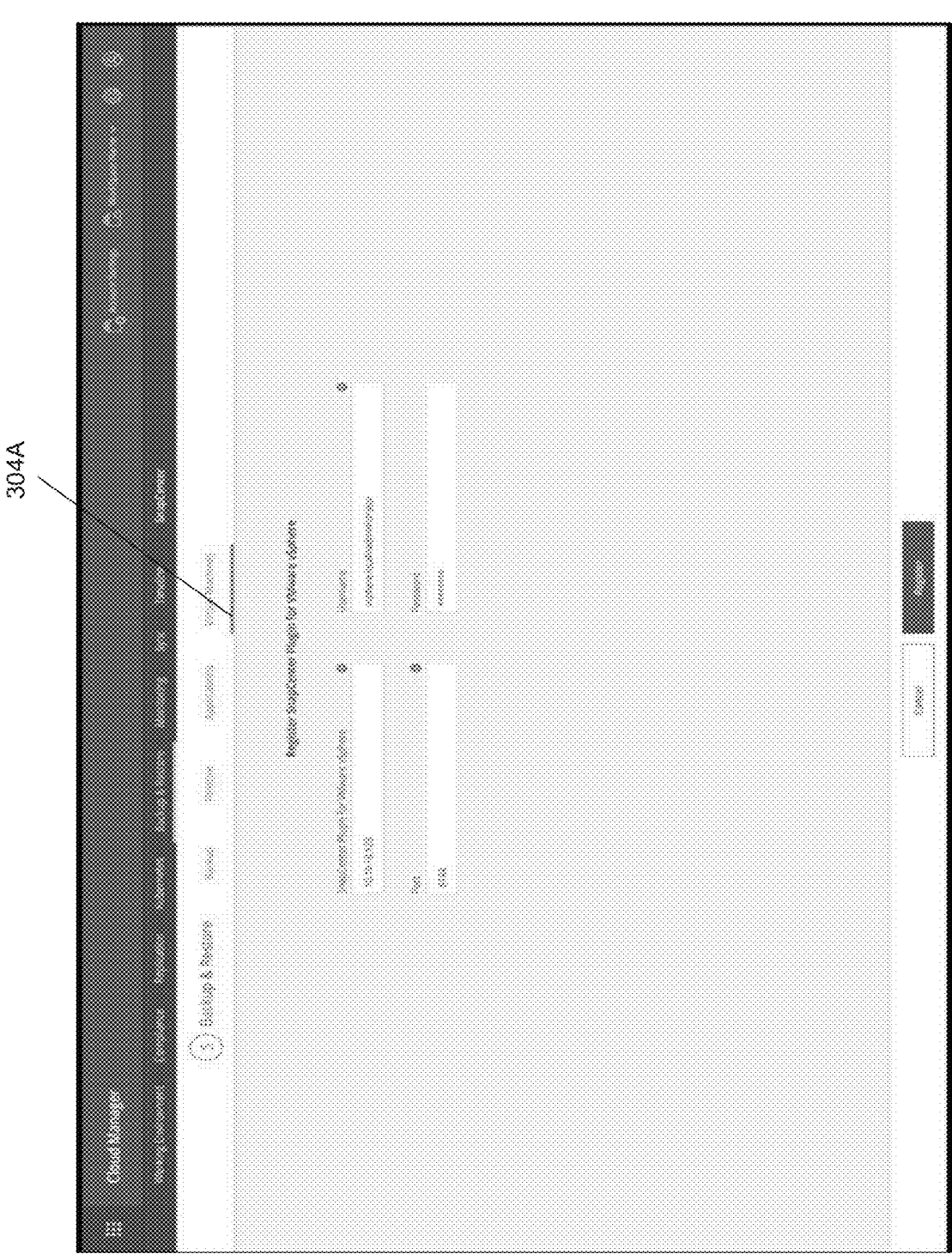
FIG. 3B shows an example of a screen to register a virtual machine plugin executed by a management system, according to one aspect of the present disclosure.
Figure 3C:
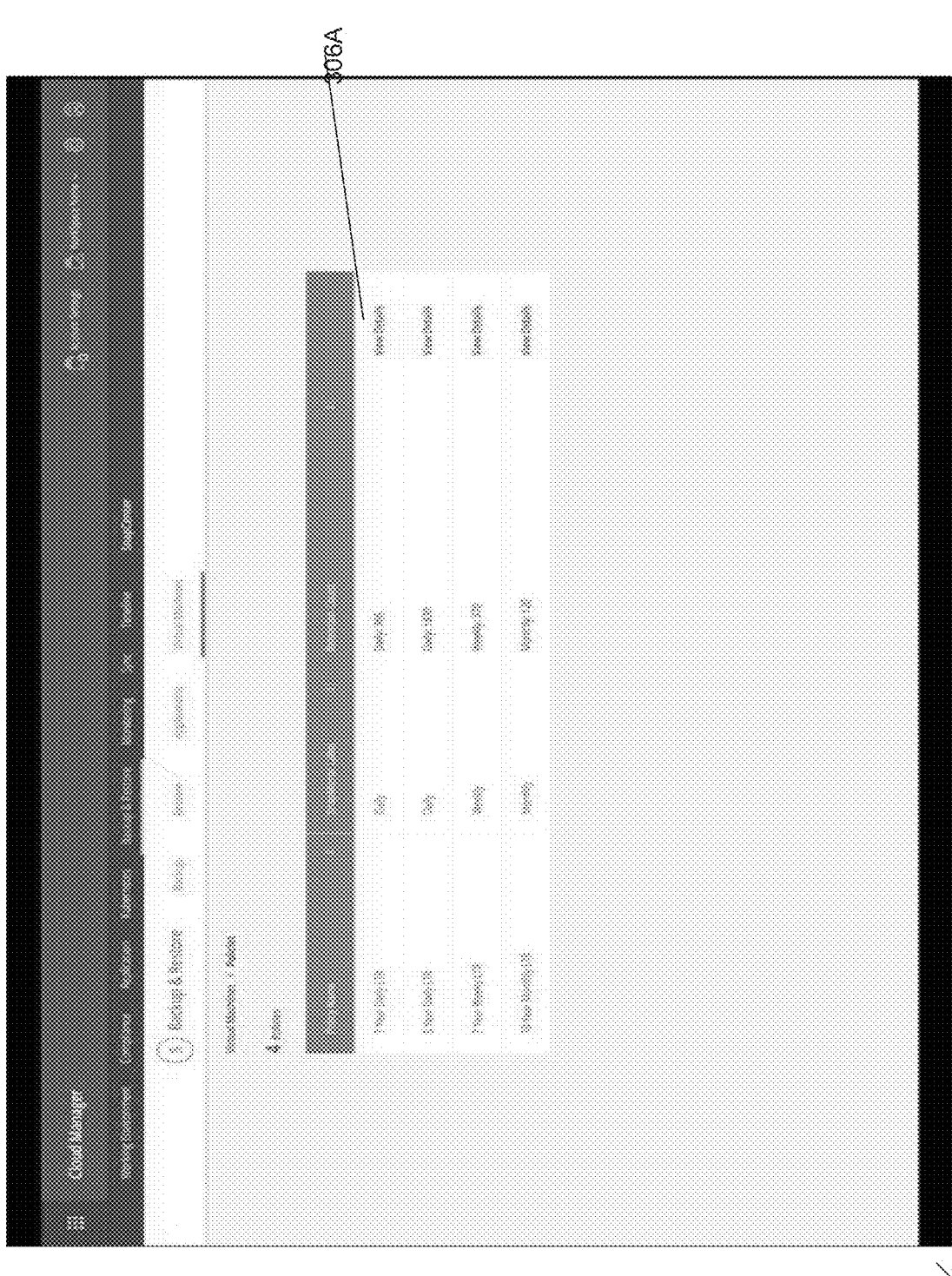
FIG. 3C shows an example of a screen with hybrid protection policies, according to one aspect of the present disclosure.
Figure 3D:
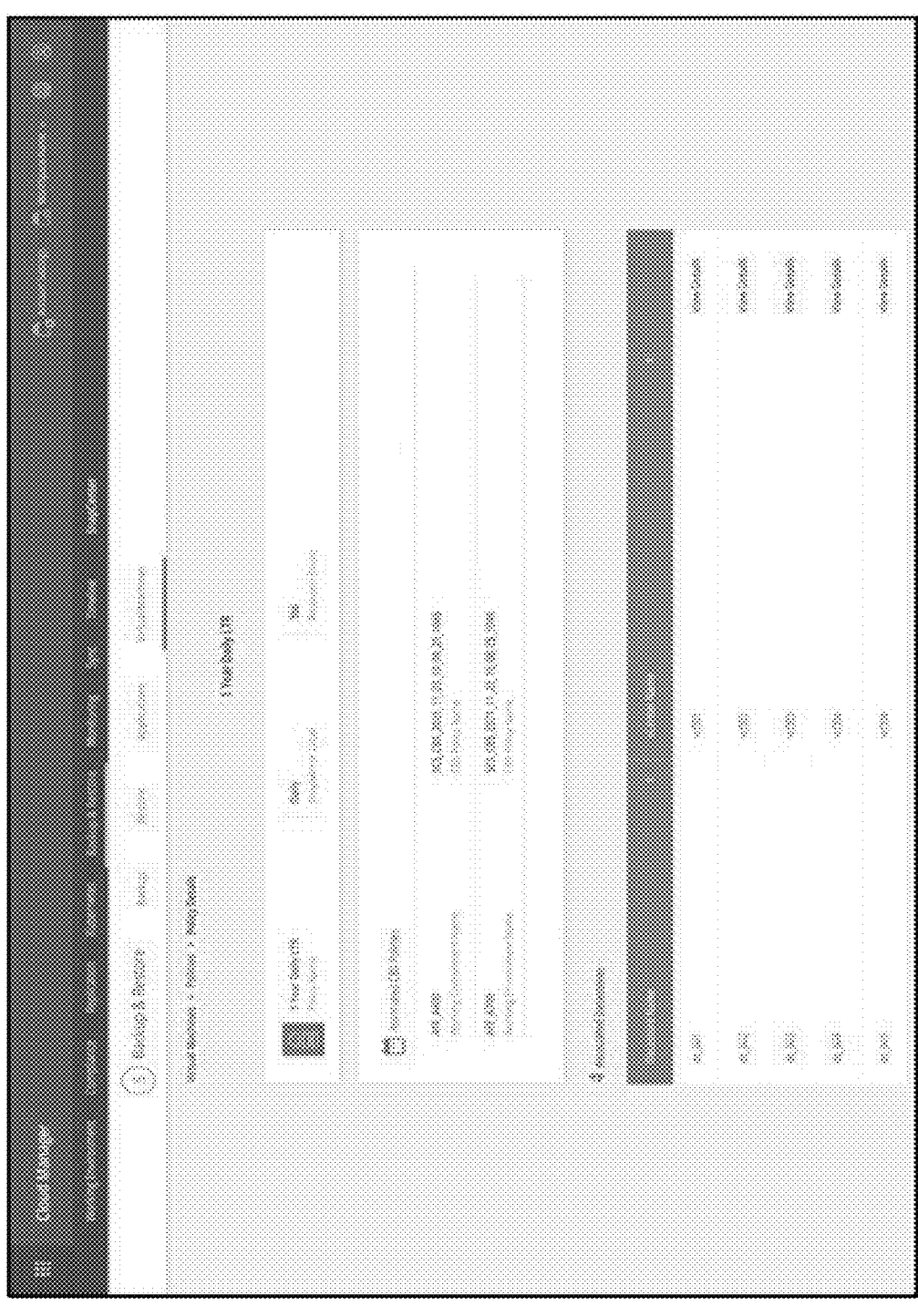
FIG. 3D shows an example of a screen with policy details based on a selection from the screen of FIG. 3C, according to one aspect of the present disclosure.

FIG. 3B shows an example of a screen shot 304 that is presented to a user for the first time and when the user selects the "virtual machines" option 304A. This enables a user to register the VM plugin 127 that is executed by the manage-ment system 132. FIG. 3C shows an example of a screen shot 306 with a listing of selectable policies that can be applied to a VM/datastore for hybrid protection as described above. A user can view the details of each policy by selecting the "view details" option 306A that presents the screen shot 308 of FIG. 3D. FIG. 3D shows the various datastores that are associated with the hybrid polices, and the name of the VM manager (shown as "vSphere" name).

Figure 3E:
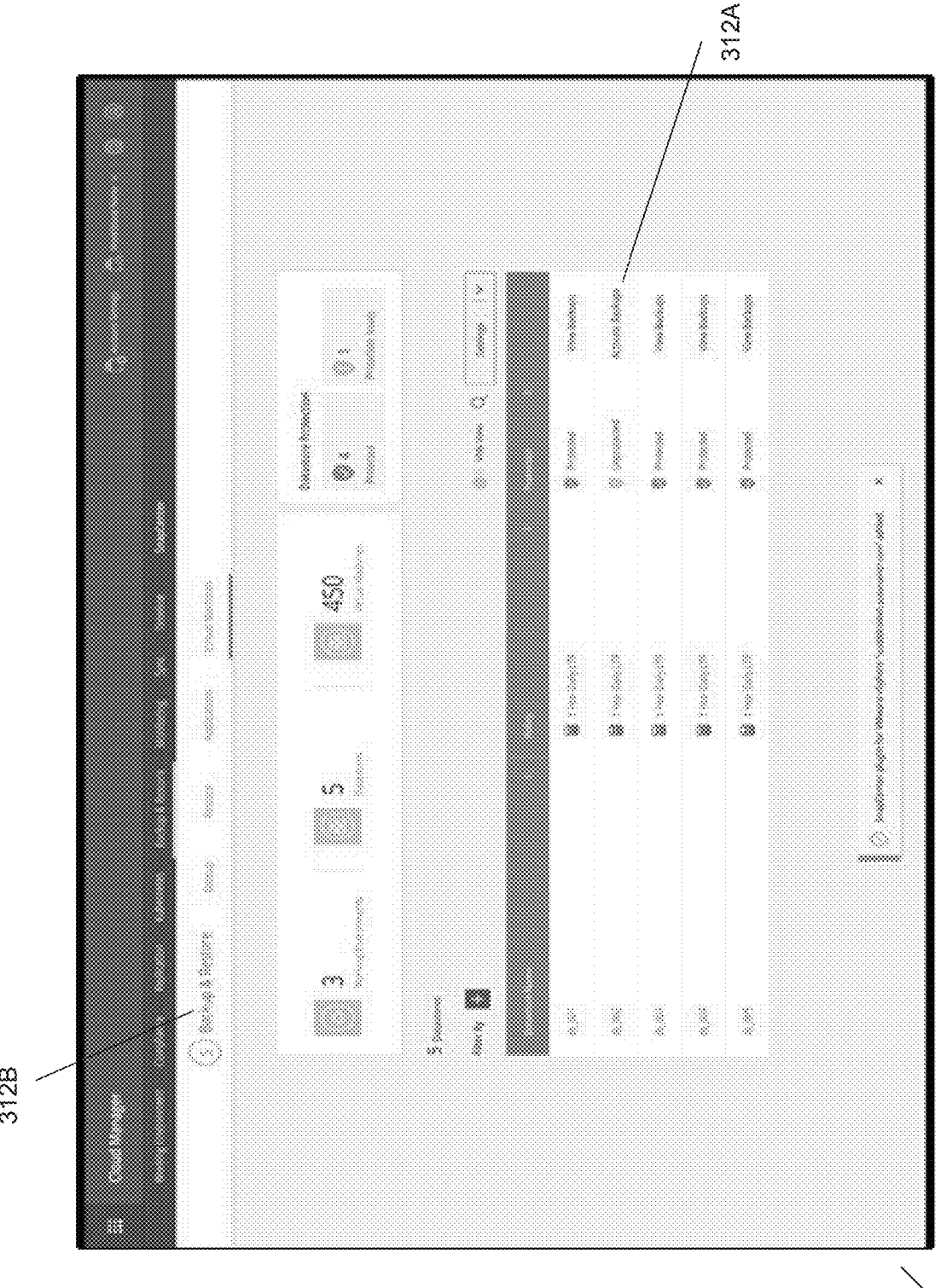
FIG. 3E shows an example of a screen with various datastores used by virtual machines and their protection status, according to one aspect of the present disclosure.
Figure 3F:
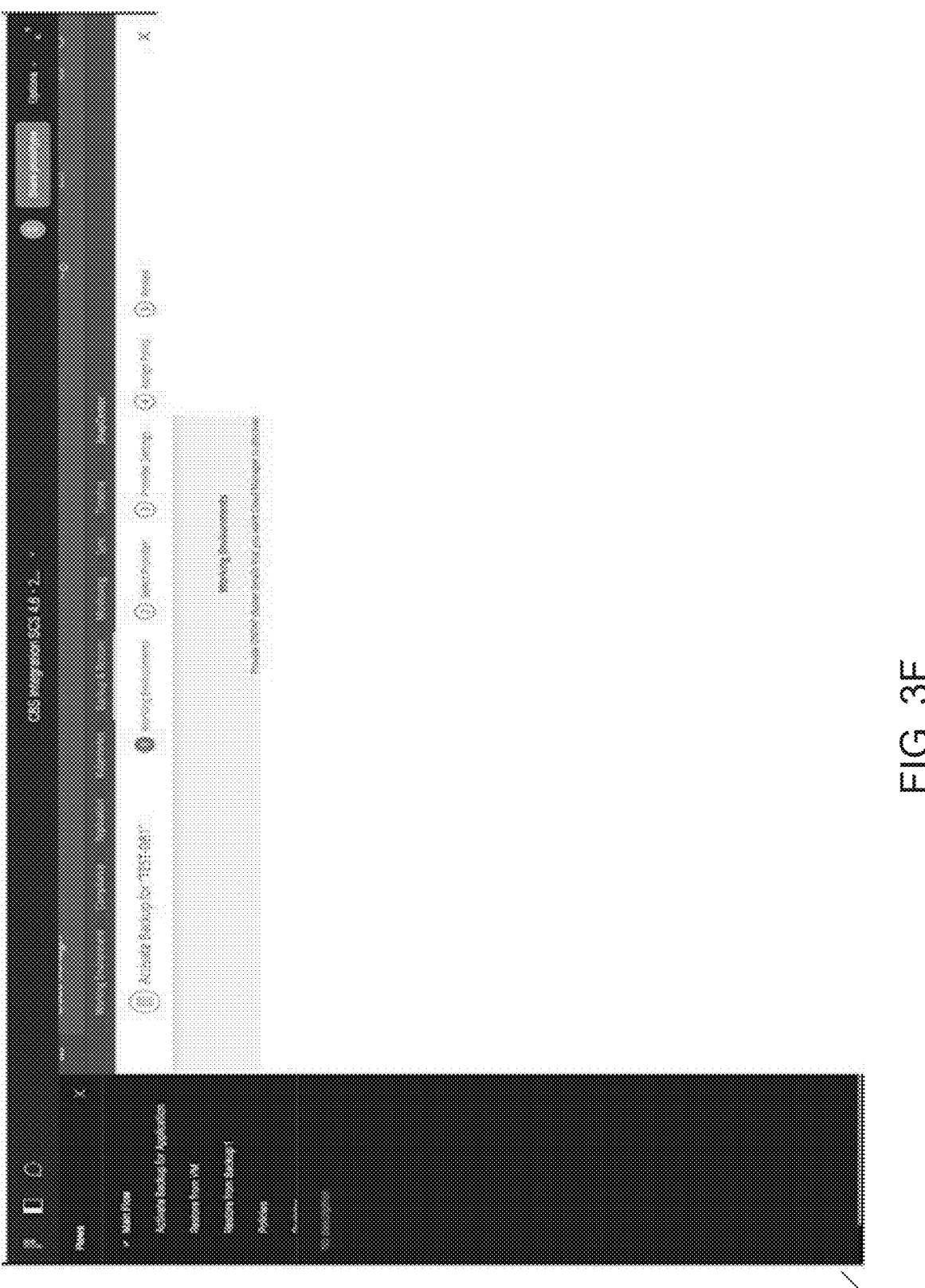
FIG. 3F shows an example of registering a working environment, according to one aspect of the present disclosure.
Figure 3G:
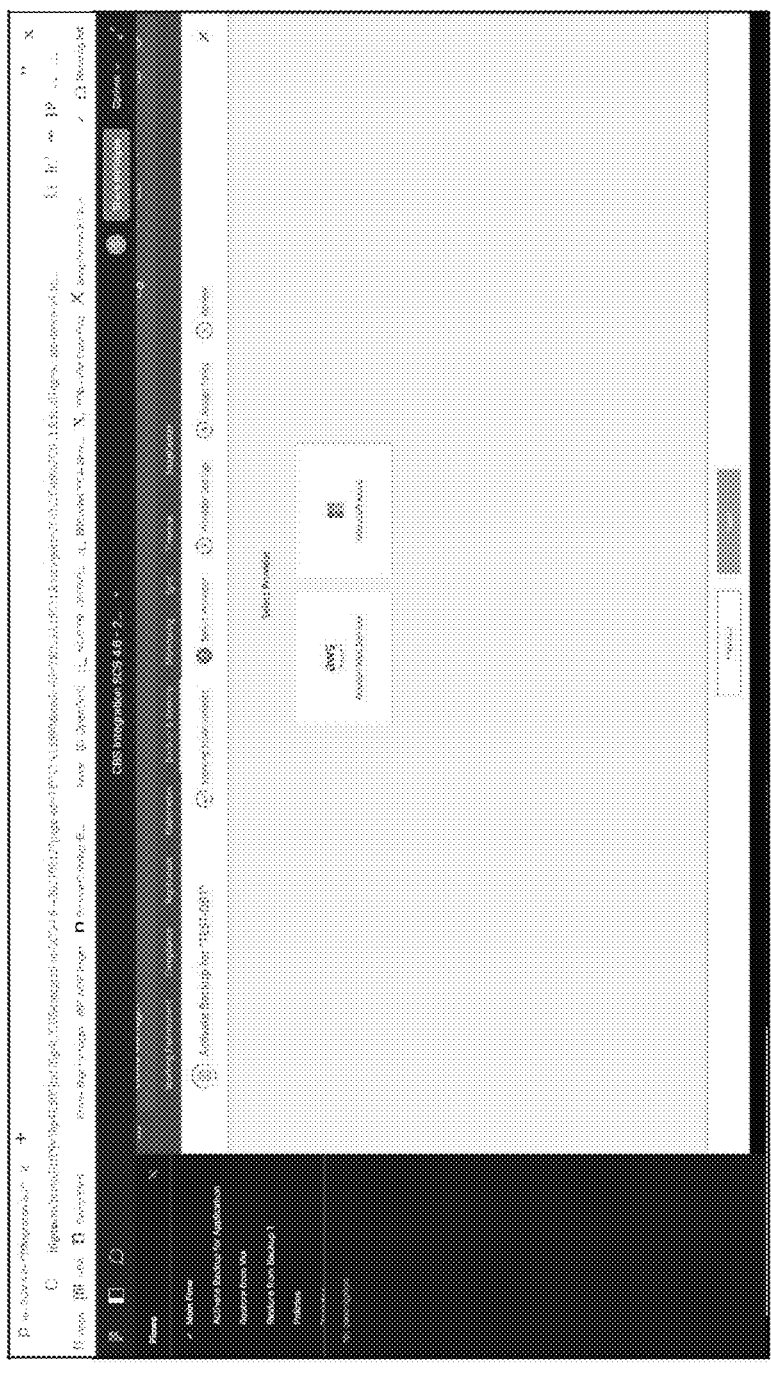
FIG. 3G shows an example of a selecting a cloud provider, according to one aspect of the present disclosure.
Figure 3H:
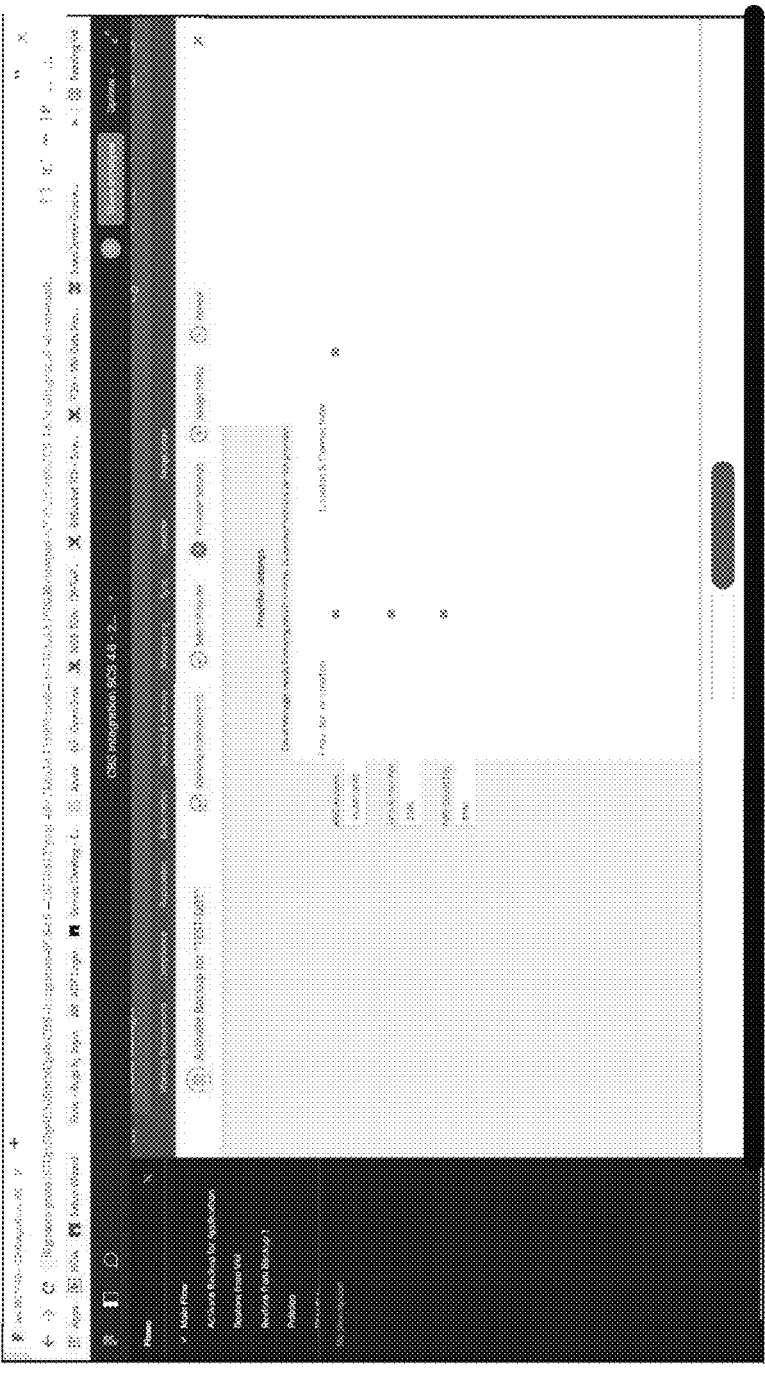
FIG. 3H shows an example of a screen with cloud provider details, according to one aspect of the present disclosure.
Figure 31:
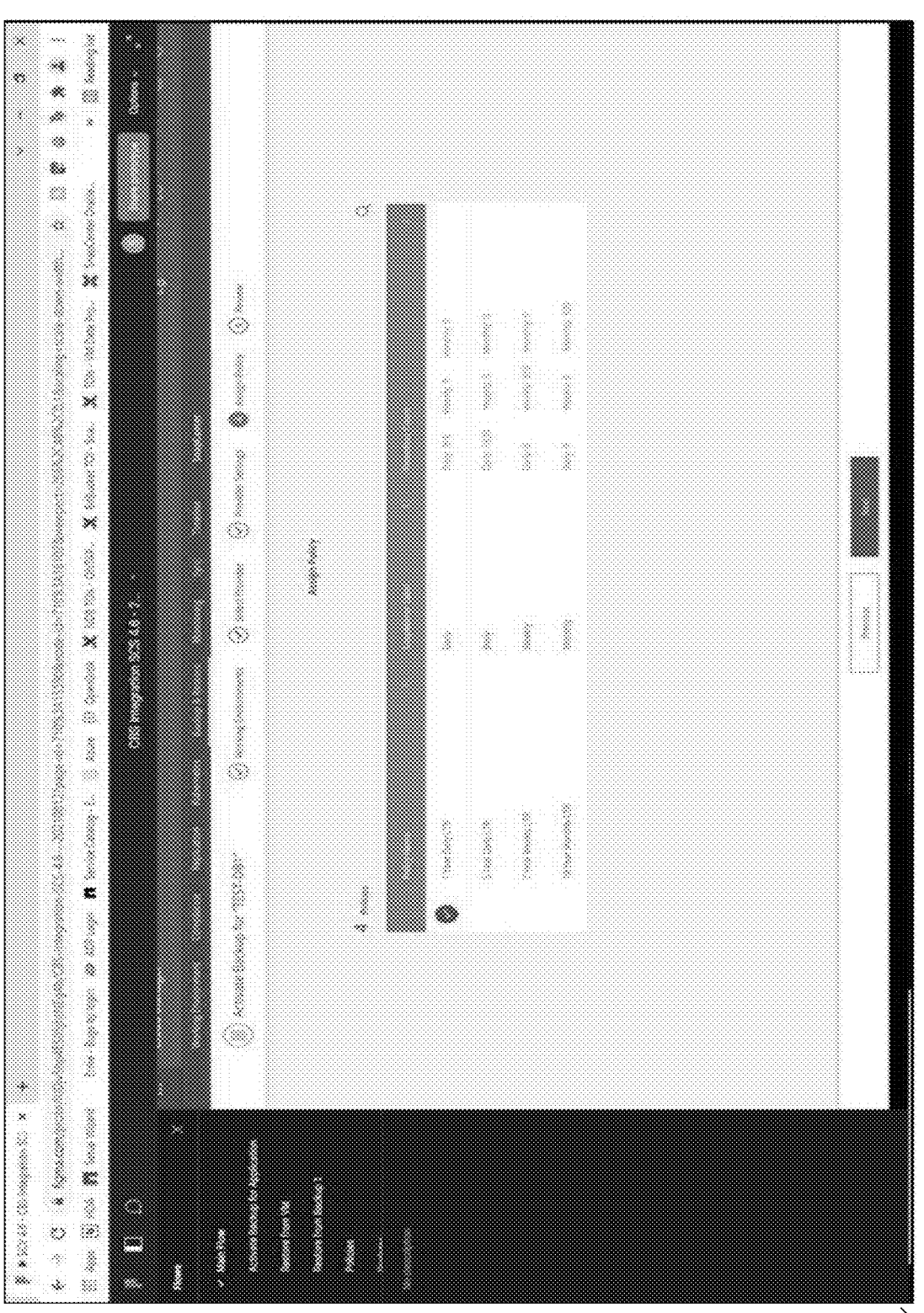

After, the VM plugin 127 is registered, a default screen 312 of FIG. 3E is presented. Under the Backup & Restore" tab 312A, the screen presents "datastores," that store VM data, associated policies, protection status as well as an option "activate backups" 312B from the cloud manager 122 for unprotected data stores. When the link 312B is selected from screen shot 312, the process presents screen 314 of FIG. 3F to add a working environment for the unprotected data store. The working environment in this context is the storage system 120 that stores data for the unprotected data store. Thereafter, the user can add a cloud provider via screen shot 316 of FIG. 3G. The screen shot 318 of FIG. 3H shows details of the cloud provider, while FIG. 3I screen shot 320 shows an assigned policy for the data store.

Figure 3J:
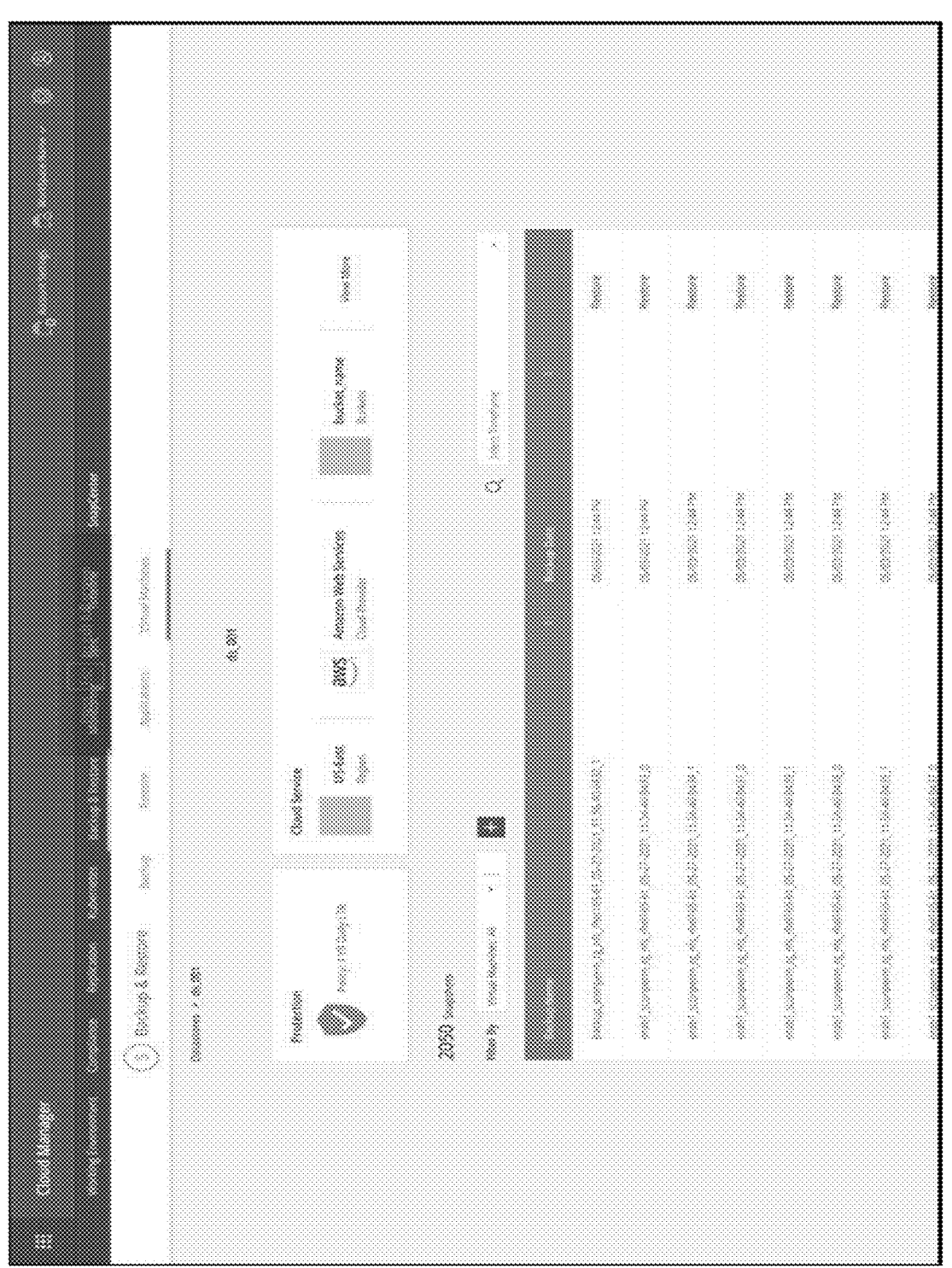
FIG. 3J shows an example of a screen with protection status of various virtual machines using a datastore, according to one aspect of the present disclosure.
Figure 3K:
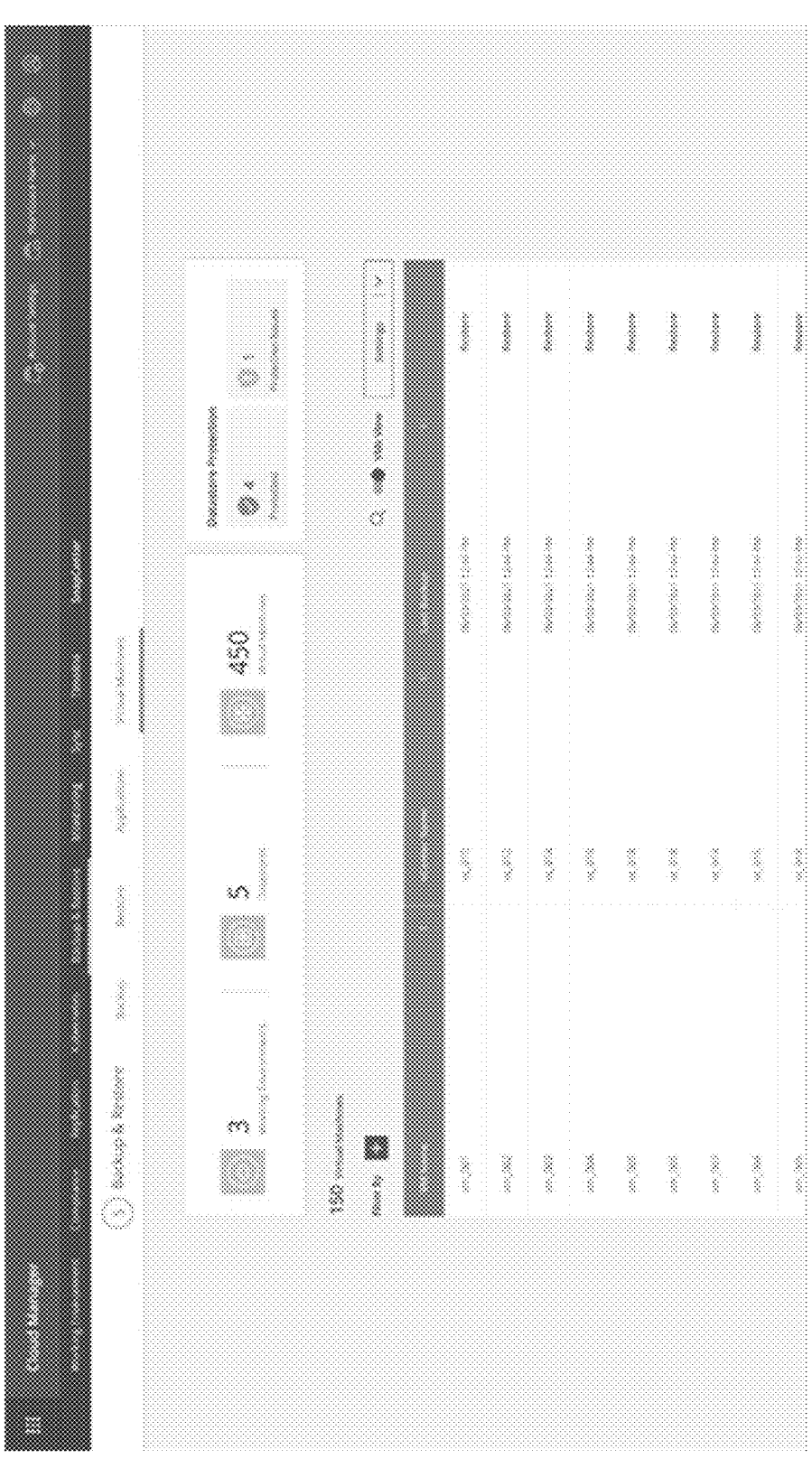
FIG. 3K shows an example of a screen with an option to select a restore operation for a virtual machine, according to one aspect of the present disclosure.
Figure 3L:
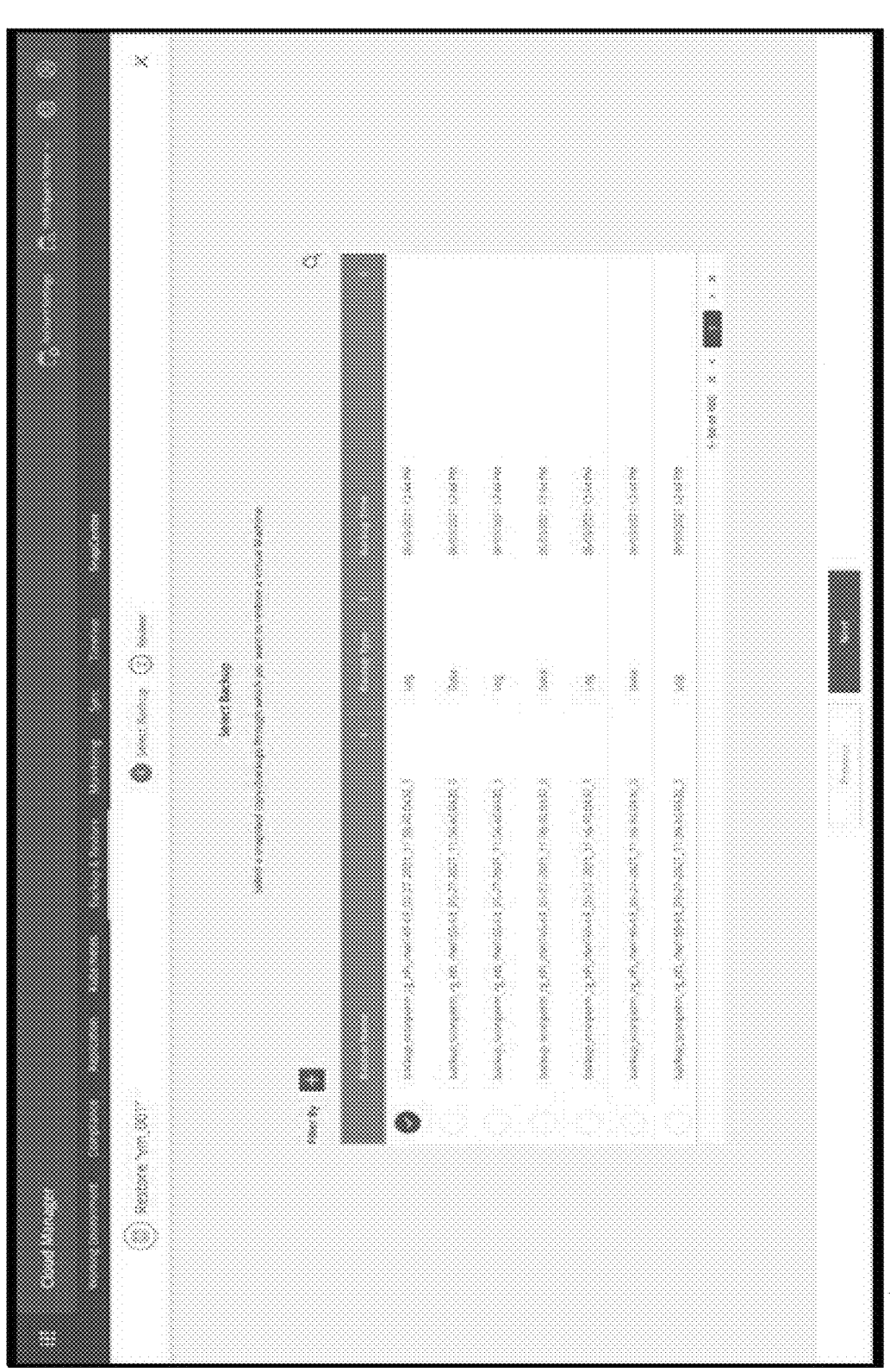
FIG. 3L shows an example of a screen with an option to select a backup for a restore operation to restore a virtual machine, according to one aspect of the present disclosure.
Figure 3M:
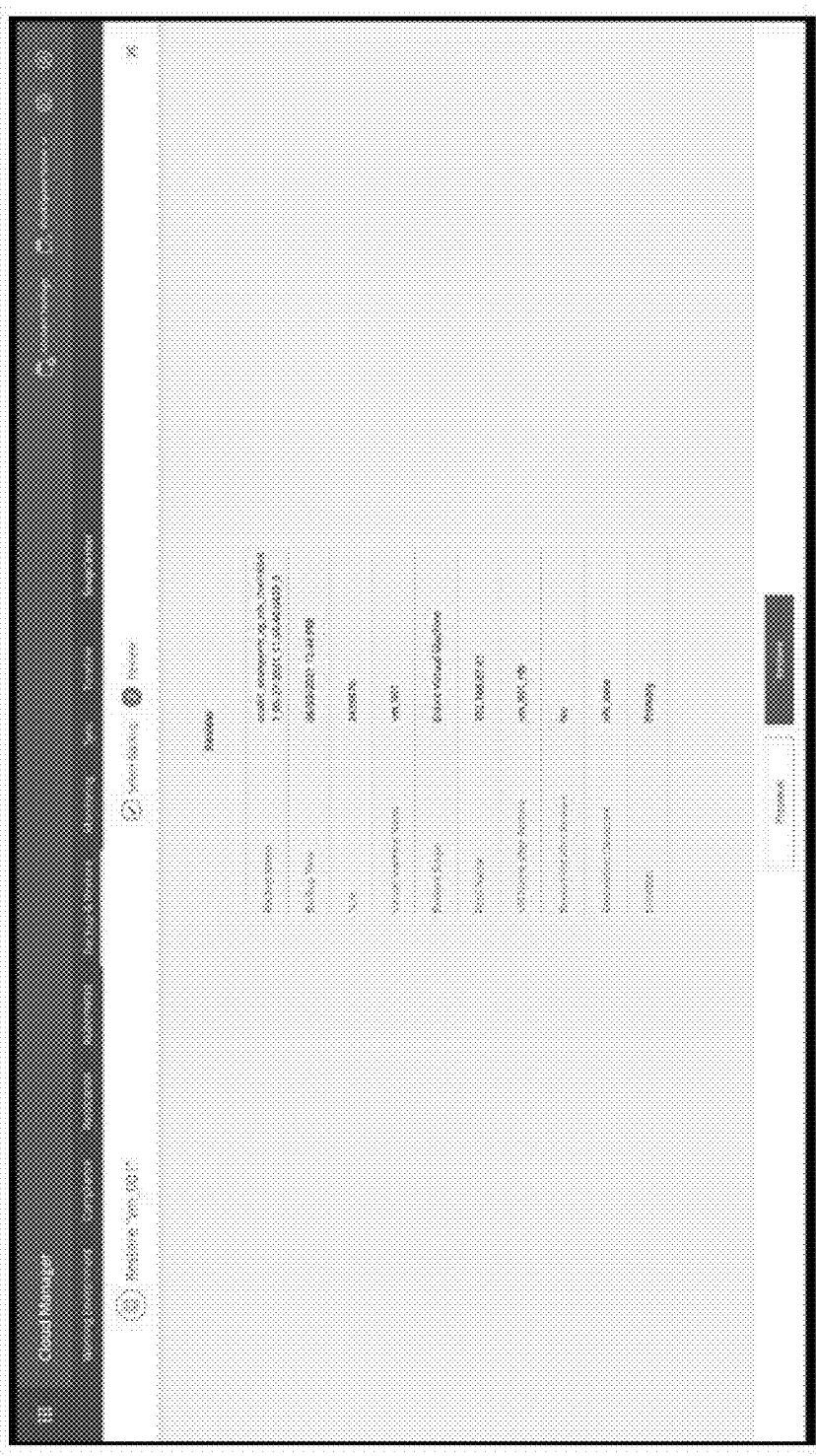
FIG. 3M shows an example of a screen that presents the overall view of the restore operation upon completion, according to one aspect of the present disclosure.

A user can view all datastores and their protection status, as shown in screen shot 322 of FIG. 3J. A user can select a VM for restore operation from screen shot 322. This provides screen shot 324 of FIG. 3K, from where the user can select a backup for the restore operation, as shown in screenshot 326 of FIG. 3L and described above in detail. Once the restore operation is complete, screen shot 328 of FIG. 3M is presented to the user.

In one aspect, methods, and systems for hybrid protections of VMs from the cloud manager 122 are provided, as described above with respect to FIGS. 1C, 1D, 1H and screen shots 3A-3M. For example, one method includes: registering, by a cloud-based micro-service (e.g. including the cloud manager 122 and agent 106), a storage system 120 configured to store data for a VM; creating, by the cloud-based micro-service, a policy for the VM for generating a VM backup by a storage management system (e.g., 132) interfacing with the storage system 120 and the cloud-based micro-service; storing, by the cloud-based micro-service, the VM backup stored by the storage system to a cloud-based storage (e.g., 138); receiving, by the cloud-based micro-service, an indication from the storage management system of a successful performance of a pre-restore operation upon unregistering the VM from a VM management system (e.g., 108); and copying, by the cloud-based micro-service, VM files from the VM backup stored at the cloud-based storage to the storage system for executing a restore operation to restore the VM at the storage system.

The method further includes re-registering the VM with the VM management system, upon restoring the VM at the storage system. The method also includes utilizing, by the cloud-based micro-service, a pre-restore application programming interface (API) (e.g., 122C) to instruct a VM plugin 127 executed by the storage management system to execute the pre-restore operation. The method further includes utilizing, by the cloud-based micro-service, a restore application programming interface (API) (e.g., 122C) to instruct a VM plugin executed by the storage management system to execute the restore operation to restore the VM at the storage system from the VM backup stored at the cloud-based storage.

The method further includes receiving, by the cloud-based micro-service, a notification from a VM plugin executed by the storage management system of successful execution of a restore operation to restore the VM at the storage system from the VM backup stored at the cloud-based storage. The method further includes creating, by the cloud-based micro-service, a job object to track the restore operation; and updating, by the cloud-based micro-service, the job object upon receiving the notification.

In one aspect, methods, and systems for hybrid protections of applications from the cloud manager 122 are provided, as described above with respect to FIGS. 1C, 1E, 1F, 1G and screen shots 2A-2K. For example, one method includes identifying, by a cloud-based micro-service (e.g., 122 and 106), a working environment used by an application to store data for an application, the working environment (e.g., 120) including a non-cloud based, storage system managed by a storage management system (e.g., 132); associating, by the cloud-based micro-service, a policy to protect the application and the data; in response to the policy, storing, by the cloud-based micro-service, a copy of a backup of the application and the data stored at a first volume location by the storage management system to a cloud based storage separate from storage of the storage system; providing, by the cloud-based micro-service, application data from the cloud-based backup to a second volume location managed by the storage system interfacing, by the cloud-based micro-service with the storage management system for a restore operation to restore and recover the application and the data from the second volume location; and polling, by the cloud-based micro-service, a job object for tracking the restore operation, and upon completion of the restore operation, providing access to the restored application and the data.

The method further includes generating, by the storage management system, the job object for tracking the restore operation. The method also includes notifying, by the cloud-based micro-service, a client system upon determining from the job object completion of the restore operation.

The method further includes receiving, by the cloud-based micro-service, a notification from a database plugin executed by the storage management system of successful execution of the restore operation. The method also includes updating, by the cloud-based micro-service, the job object upon receiving the notification. The method further includes presenting, by the cloud-based micro-service, an interface to a client system for adding the working environment for the application.

Figure 3N:
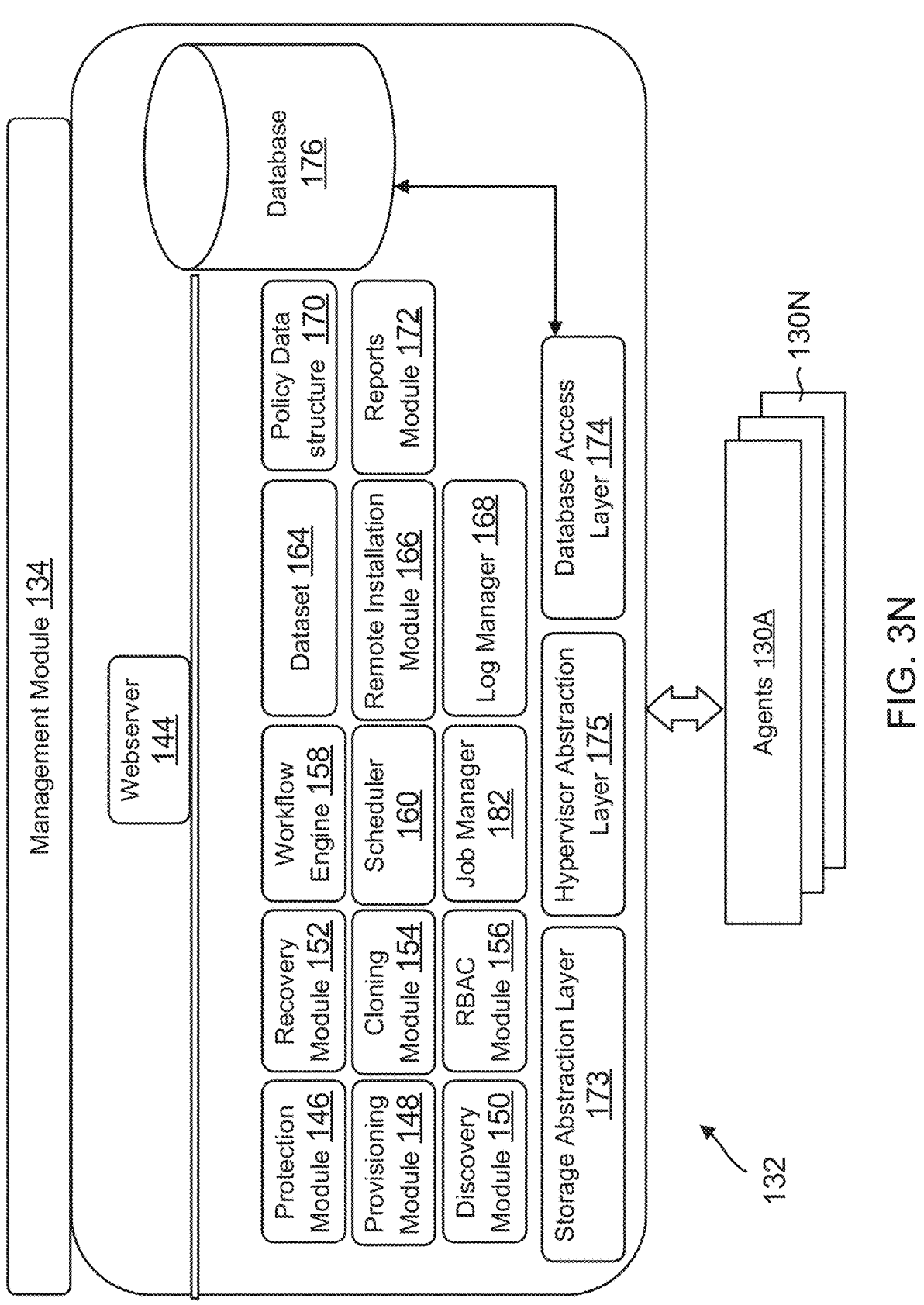
FIG. 3N shows a block diagram of an on-premise management module, according to one aspect of the present disclosure.

Management System 132: FIG. 3N shows a block-level diagram of the on-premise, management system 132 with the management module 134, according to one aspect of the present disclosure. The management module 134 may be executed by a stand-alone system or may interface with another management console/application to manage and interface with multiple instances of agents' 130A-130N. The management module 134 may also be implemented as an application within a VM environment of host 102A. The management module 132 is configured to interface with host systems 102A-102N, the storage system 120 and the message poller 104 and the cloud manager 122, as described above, which enables a user to manage cloud-based storage and on-premise storage from a single application. It is noteworthy that the management module 134 and agent 130A-130N include various components that are like the components of the storage micro-service 106 described above. The functionality of the common components can be implemented in the cloud layer 136, as described above.

The management module 134 includes a web server 144 for enabling Internet based communication. As an example, web server 144 may be implemented as an Internet Information Services (IIS) for a Windows® Server web server (without derogation of any third-party trademark rights). The web server 144 interfaces with a workflow engine 158 (similar to the workflow engine 158 of the storage micro-service 106 described above) that coordinates and manages various tasks that are performed by the different components of the management module 134.

In one aspect, the workflow engine 158 coordinates dataset 164 creation, policy allocation and manage a database 176. The workflow engine 158 communicates with various agents 130A-130N (like agent 106, described above) for host system related storage service operations.

In one aspect, the management module 134 also includes a protection module 146, a provisioning module 148, a discovery module 150, a recovery module 152, a cloning module 154, a role based access control (RBAC) module 156, a storage abstraction layer (may also be referred to as "SAL") 173, a hypervisor abstraction layer (may also be referred to as "HAL") 175, a scheduler 160, a job manager 182, a remote installation module 166, a log manager 168, a policy data structure 170, a reports module 172 and a database access layer 174 that can access the database (or any other data structure type) 176. The database 176 stores various data structures (or objects) in a format that allows the management module 134 to handle storage services for different applications/host systems.

The log manager 168 collects logs from agents 130 and the various plugins. The logs can then be presented to a user via a GUI (e.g., SSUI 110). The logs may be for event management and audit for various management system 132 operations. The logs may be collected for a job based on a job identifier.

The protection module 146 is used to enforce a policy for a storage service related job (e.g., backup and/or restore operations). The protection module 146 maintains a protection policy for a plurality of objects (or protection group) that are to be backed up and provides protection service for backing up the protection group objects. Based on an application object, a call is made to an appropriate plugin for providing the appropriate protection service.

In one aspect, the protection module 146 maintains protection group objects for abstract representation of a container of application objects where protection of application objects is defined by policy objects. The protection group objects map to dataset objects 164 (shown as dataset 164).

The provisioning module 148 allows a user to configure and provision a LUN/volume/datastore (used interchangeably) that may be used to store information from the cloud manager 122. The provisioning module 148 allows a user to set a LUN size and appropriate permissions for using the LUN, for example, reading and writing data, permission for changing a LUN size, deleting a LUN and other operations. Storage volume information is saved in a standard format at database 176 and includes, name of the storage volume, storage connection identifier, size, a junction path, date volume was created and an aggregate.

The discovery module 150 interfaces with the agents 130A-130N executed at different host systems to obtain information regarding the host systems, storage resources used by various applications and information regarding data containers that are protected (i.e., backed up) and unprotected. The discovery module 150 also facilitates discovery and management of application specific objects, for example, VMs, databases, hypervisor, and others. Based on the application type, an appropriate plugin is used to discover different objects.

In one aspect, the discovery module 150 initiates a discovery operation with the agents 130. An API presented by the management module 134 determines if an agent 130 is installed at a host system. If the agent 130 is installed, then the agent 130 discovers the various plugins at that host system. If the agent 130 is not installed, then it is installed by the remote installation module 166 and the appropriate plugins are installed as well.

The cloning module 154 is used to clone storage volumes that are maintained by the storage system 120. The cloning module 154 is also used for managing the life cycle of a clone. The term clone as used herein is a duplicate copy of a snapshot. The term clone life cycle management means generating a clone and deleting a clone by the user when it is no longer required.

The RBAC module 156 stores information regarding different clients/entities that are given access to storage. For example, a business unit may be allowed to read certain storage volumes and may not be allowed to backup, clone, replicate or delete any storage volume. The RBAC module 156 manages the various roles and access type for different applications that may be executed in different host systems/ computing environments including a multitenant database environment described above.

In one aspect, RBAC module 156 includes an authentication and authorization module. User authentication may happen at multiple end points, for example, via a GUI login, a login API for clients or plugins and others. The authentication module authenticates users against different domain/ subsystem requirements, for example, an Active Directory, a local Windows machine host system, open LDAP (lightweight directory protocol) and others. Once a user is authenticated, an encrypted token is generated based on user information. In another aspect, a hash token is generated based on the generated token. The hashed token is saved at database 176. The hashed token may be based on MD5 (Message Digest Algorithm, 5, SHA (secure hash algorithm)-1 or any other technique.

When the authenticated user logs back in, the user passes the token and the management system 132 decrypts the token, validates the token and regenerates the hash value. The hash value is compared with the stored hash value in database 176.

In one aspect, the authorization module of the RBAC module 156 creates custom roles (for example, an administrator, backup administrator, backup operator, backup viewer, restore administrator and others), modifies existing roles, assigns and unassigns permissions to and from a role (for example, a dataset, policy, host, storage connection, a dashboard, a report, discovery, remote installation and others), assigns and unassigns users to roles and assigns and unassigns resources (for example, hosts, datasets, policy and others).

In one aspect, roles determine a set of capabilities that are available to members of the role. For example, a backup administrator may be allowed to add a host system, add a tenant database, install plugins, create a dataset, create a backup dataset, delete a dataset, create policies, delete backups, restore applications and others. A backup operator may be allowed to start and stop existing dataset jobs, monitor backups, view backup reports and perform application level restore operations. A backup viewer may be given read only access to backups, view existing backups and review job session details. A restore administrator may be allowed to perform restore operations using existing backups. The adaptive aspects described herein are not limited to these roles.

All the tasks conducted by the management module 134 are organized and monitored by the job manager 182. The job schedules are managed by the scheduler 160. When a new job arrives, the job manager 182 stores the job information in a database (for example, 176) with other existing jobs. The job manager 182 creates sub-tasks for executing the appropriate workflows. The sub-tasks depend on the nature of the job (for example, backup, restore, cloning or others). The job manager 182 updates the status of each task to provide real-time updates via the cloud manager 122.

In one aspect, the policy data structure 170 is used to store polices for different stored objects. The policy information is configurable and may be changed by a user. In one aspect, the policy data structure 170 format is the same across different applications. This enables the management module 134 to manage storage services across different platforms with different requirements and operating parameters. The policy data structure 170 includes various policy objects to store various policies each with a set of attributes that may be applied to any dataset. The policy object stores a policy identifier, a policy name, description, a backup schedule policy, a retention count as to how long a backup is to be retained, a mirroring label for hybrid protection in cloud-based storage 138, a replication policy to replicate a backup from one location to another, types of backups, application consistent backups, and verification policies to verify a backup and others. It is noteworthy that a policy object may be shared across multiple datasets for multiple applications/plugins.

The reports module 172 is used to provide reports to users. The reports may be for different applications and in different formats.

In one aspect, the management module 134 maintains the dataset 164 for different applications and application objects. Each dataset is uniquely identified and named. The dataset format for managing replication for different applications is the same, regardless of how the applications handle information. A dataset may be associated with a policy data structure that defines how an object is to be protected. The dataset format used by the various aspects of the present disclosure allows a user to add or remove stored objects that need to be protected.

In one aspect, dataset 164 represents a container of application objects/VM objects where protection attributes may be defined in terms of backup policy, replication profiles and retention policies. Dataset 164 is a basic unit that is used to manage backup, restore and cloning operations described above. A user can add any permissible resource to the dataset from multiple host systems/applications.

The database access layer 174 saves information in the database 176. The database 176 may be used to store information that is discovered by the discovery module 150, policy information, host information, datasets, and other information.

In one aspect, the database 176 may store various data structures for managing the storage services and providing status via the cloud manager 122. As an example, the database schema for the database 176 is application format independent and may include various data structures to identify different host systems to specific login information, a backup metadata structure for storing information regarding backups, a data structure to map backups to stored objects including VMs, databases and others, a data structure for storing information on backup types, i.e. application consistent, full backup, copy backup, log backup for identifying volumes that are involved in each backup, a data structure to track various jobs that are managed by the job manager 182, discovery objects for storing information that is discovered by the discovery module 150, policy data structure 170, storage footprint and storage resource information, a data structure for storing information regarding various plugins, roles, role attributes, storage connections and user information, including credentials.

In one aspect, SAL 173 stores information regarding the various storage resources that are used and available for different hosts. SAL 173 maintains a "storage footprint" or storage layout for different storage resources (for example, storage systems including storage devices) used by different applications.

In one aspect, HAL 175 is used to communicate with another plugin that is used to collect information related to storage used by different virtual machines.

Figure 3O:
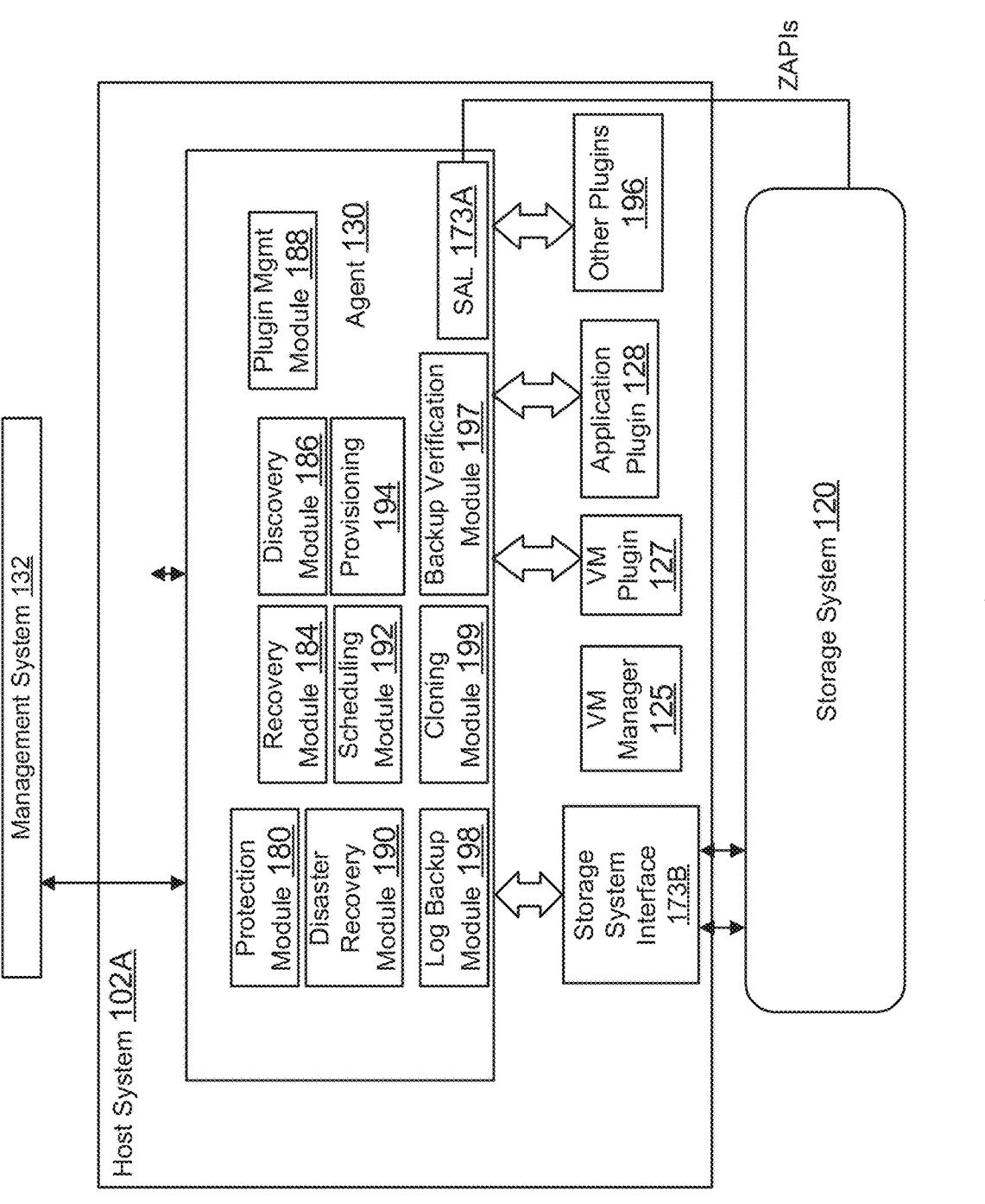
FIG. 3O shows a block diagram of an agent used by a computing system (or host system) for interfacing with the management module and other components of FIG. 1A, according to one aspect of the present disclosure.

Agent 130: FIG. 3O shows an example of the agent 130 that interfaces with the management system 132, according to one aspect of the present disclosure. The various components of agent 130 are like the components of the storage micro-service 106 that are described above. For example, the agent 130 includes a protection module 180 to manage and coordinate backup and cloning operations, a recovery module 184 to manage and coordinate restore operations to restore an object (e.g. a database), a discovery module 186 to manage and coordinate discovery operations, a plugin management module 188 to manage plugin installation at host 102, a disaster recovery module 190 to manage and coordinate disaster recovery operations, a scheduling module 192 to schedule tasks, for example, backup, cloning and restore operations, a provisioning module 194 for provisioning computing and storage resources, a log backup module 198 for managing logs for backup operations, a cloning module 199 for managing cloning operations, a backup verification module 197 for managing and coordinating backup verification operations and SAL 173A for communicating with the storage system 120.

SAL 173A maintains the storage footprint/layout for each application. In another aspect, the agent 130 interfaces with storage system 120 via the storage system interface 173B. An example of storage system interface is "SnapDrive" provided by NetApp Inc. (without derogation of any trademark rights of NetApp Inc.). In one aspect, storage system interface 173B uses storage APIs including ZAPIs (Zephyr Application Programming Interface), REST or other API types to send and receive data from storage system 120.

The backup verification module 197 verifies a backup or replication operation. Since different applications may have different requirements, the backup verification module 197 facilitates the verification for different applications.

The cloning module 199 assists in cloning a snapshot, and a log backup module 198 assists in backing up logs.

Figure 3P:
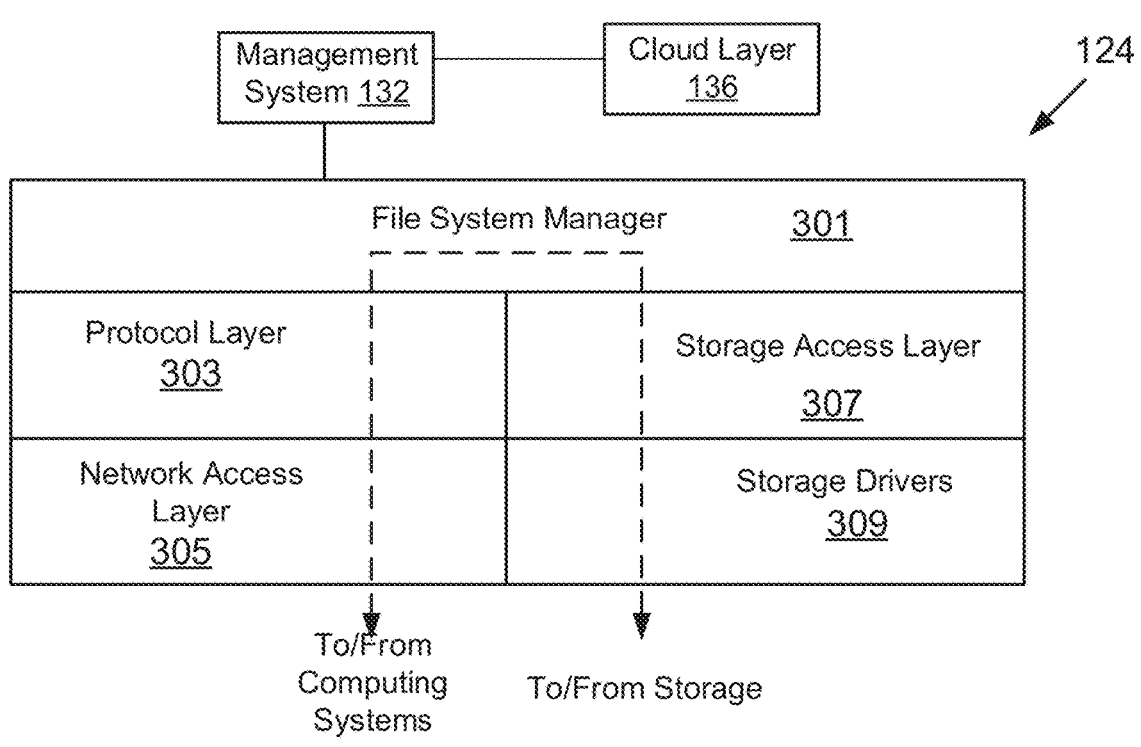
FIG. 3P shows an example of a storage operating system, used according to one aspect of the present disclosure.

Storage Operating System: FIG. 3P illustrates a generic example of storage operating system 124 executed by storage system 120 (or the cloud storage OS 140 in the cloud layer 136) and interfacing with the management system 132 that communicates with the message poller 104/the cloud manager 122, according to one aspect of the present disclosure.

As an example, operating system 230 may include several modules, or "layers". These layers include a file system manager 301 that keeps track of a directory structure (hierarchy) of the data stored in storage devices and manages read/write operations, i.e. executes read/write operations on storage devices in response to server system 102 requests.

Operating system 230 may also include a protocol layer 303 and an associated network access layer 305 to communicate over a network with other systems, such as host system 102A-102N and the cloud layer 136. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 102A-102N and mass storage devices 114 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level storage protocol, such as RAID (redundant array of inexpensive disks), while the storage driver layer 309 may implement a lower-level storage device access protocol, such as FC, SCSI or any other protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

As used herein, the term "storage operating system" refers to the computer-executable code operable on a computer to perform a storage function that manages data access and may implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure may be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems.

Figure 4:
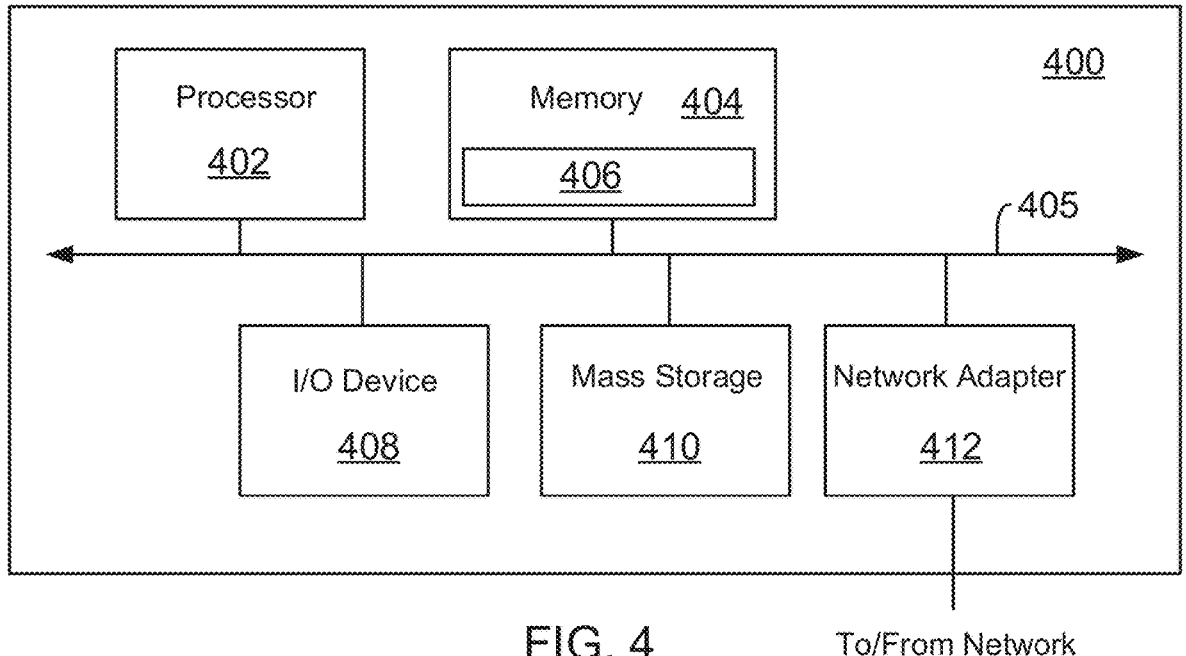
FIG. 4 shows an example of a processing system, used according to one aspect of the present disclosure.

Processing System: FIG. 4 is a high-level block diagram showing an example of the architecture of a processing system, at a high level, in which executable instructions as described above may be implemented. The processing system 400 can represent modules of the storage system 120, host systems 102A-102N, computing nodes that execute the functionality of a SaaS layer and the cloud layer 136, user 101, computing system executing the cloud manager 122, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used for executing the process blocks of FIGS. 1C-1H, the cloud manager 122, data structures 122A-122G, agents 130A-130N, management module 134 and the various plugins/applications.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, a method and apparatus for executing storage service operations have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

identifying, by a processor executable, cloud-based micro-service, a working environment used by an application to store data for an application, the working environment including a non-cloud based, storage system managed by a storage management system;

associating, by the cloud-based micro-service, a policy to protect the application and the data;

in response to the policy, storing, by the cloud-based micro-service, a copy of a backup of the application and the data stored at a first volume location by the storage system to a cloud-based storage separate from storage of the storage system;

providing, by the cloud-based micro-service, application data from the cloud-based backup to a second volume location managed by the storage system, wherein the providing the application data comprises:

interfacing, by the cloud-based micro-service, with the storage management system for a restore operation to restore and recover the application and the data from the second volume location of the storage system;

receiving, by the cloud-based micro-service, a job object, wherein the job object monitors a status of the restore operation;

polling, by the cloud-based micro-service, the job object for tracking the restore operation to restore and recover the application; and in response to the job object indicating that the status of the restore operation is complete, providing access to the restored application and the data.

2. The method of claim 1, further comprising:

generating, by the storage management system, the job object for tracking the restore operation.

3. The method of claim 1, further comprising:

notifying, by the cloud-based micro-service, a client system upon determining from the job object completion of the restore operation.

4. The method of claim 1, wherein the application is a database.

5. The method of claim 4, further comprising:

receiving, by the cloud-based micro-service, a notification from a database plugin executed by the storage management system of successful execution of the restore operation.

6. The method of claim 5, further comprising:

updating, by the cloud-based micro-service, the job object upon receiving the notification.

7. The method of claim 1, further comprising:

presenting, by the cloud-based micro-service, an interface to a client system for adding a working environment for the application.

8. The method of claim 1, wherein the policy enables hybrid protection of the application and the data at both an on-premise data center and the cloud-based storage.

9. A non-transitory machine readable storage medium having stored thereon instructions for performing a method, comprising machine executable code which when executed by at least one machine, causes the machine to:

identify, by a cloud-based microservice, a working environment used by an application to store data for an application, the working environment including a non-cloud based, storage system managed by a storage management system;

associate, by the cloud-based micro-service, a policy to protect the application and the data;

in response to the policy, store, by the cloud-based micro-service, a copy of a backup of the application and the data stored at a first volume location by the storage management system to a cloud-based storage separate from storage of the storage system;

provide, by the cloud-based micro-service, application data from the cloud-based backup to a second volume location managed by the storage system, wherein providing the application data comprises further causes the machine to:

interface, by the cloud-based micro-service, with the storage management system for a restore operation to restore and recover the application and the data from the second volume location of the storage system;

receive, by the cloud-based micro-service, a job object, wherein the job object monitors a status of the restore operation;

poll, by the cloud-based micro-service, a job object for tracking the restore operation to restore and recover the application; and in response to the job object indicating that the status of the restore operation is complete, providing access to the restored application and the data.

10. The non-transitory machine readable storage medium of claim 9, wherein the application is a database.

11. The non-transitory machine readable storage medium of claim 10, wherein the machine executable code further causes the machine to:

generate, by the storage management system, the job object for tracking the restore operation.

12. The non-transitory machine readable storage medium of claim 9, wherein the machine executable code further causes the machine to:

notify, by the cloud-based micro-service, a client system upon determining from the job object completion of the restore operation.

13. The non-transitory machine readable storage medium of claim 11, wherein the machine executable code further causes the machine to:

receive, by the cloud-based micro-service, a notification from a database plugin executed by the storage management system of successful execution of the restore operation; and update, by the cloud-based micro-service, the job object upon receiving the notification.

14. The non-transitory machine readable storage medium of claim 13, wherein the machine executable code further causes the machine to:

present, by the cloud-based micro-service, an interface to a client system for adding a working environment for the application.

* * * * *